US010397308B2

(12) United States Patent
Seyedmehdi et al.

(10) Patent No.: US 10,397,308 B2
(45) Date of Patent: Aug. 27, 2019

(54) FILE TRANSFER BY MOBILE USER COLLABORATION

(71) Applicant: Telefonaktiebolaget LM Ericsson (publ), Stockholm (SE)

(72) Inventors: Seyed Hossein Seyedmehdi, Kanata (CA); Gary David Boudreau, Kanata (CA); Ronald Casselman, Metcalfe (CA); Jan Mikhail, Ottawa (CA); Misagh Tavanpour, Ottawa (CA); Gabriel Wainer, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/580,186

(22) PCT Filed: Jun. 15, 2015

(86) PCT No.: PCT/IB2015/054524
§ 371 (c)(1),
(2) Date: Dec. 6, 2017

(87) PCT Pub. No.: WO2016/203291
PCT Pub. Date: Dec. 22, 2016

(65) Prior Publication Data
US 2018/0219937 A1 Aug. 2, 2018

(51) Int. Cl.
*H04B 7/00* (2006.01)
*H04L 29/08* (2006.01)
(Continued)

(52) U.S. Cl.
CPC .......... *H04L 67/06* (2013.01); *H04J 11/0053* (2013.01); *H04L 5/0035* (2013.01);
(Continued)

(58) Field of Classification Search
CPC ............. H04W 72/12; H04W 72/1252; H04W 72/1263; H04W 76/02; H04W 76/025
(Continued)

(56) References Cited

U.S. PATENT DOCUMENTS 7,113,790 B2    9/2006  Athalye
8,433,280 B2 *  4/2013  Wu ........................ H04W 4/90
                                                          455/404.1
(Continued)

FOREIGN PATENT DOCUMENTS

RU          2364041 C2     8/2009
WO       2011060589 A1     5/2011
(Continued)

OTHER PUBLICATIONS

Author Unknown, "Long Term Evolution Protocol Overview," White Paper—Freescale Semiconductor, Inc., Oct. 2008, 21 pages.
(Continued)

*Primary Examiner* — Dmitry Levitan
(74) *Attorney, Agent, or Firm* — Sage Patent Group

(57) ABSTRACT

Systems and methods for file transfer by mobile user collaboration are provided. In some embodiments, a method of operation of a first wireless device for uploading a data file as multiple pieces to a destination network node in a wireless communications network includes dividing the data file into the multiple pieces; sending one or more pieces of the multiple pieces to one or more second wireless devices to be uploaded to the destination network node; and uploading one or more pieces via a Coordinated Multi-Point (CoMP) set of cooperating nodes in the wireless communication network. In this way, the first wireless device may be able to upload the data file to the destination network node faster than if the first wireless device uploads the entire date file directly.

28 Claims, 22 Drawing Sheets

(51) Int. Cl.
  *H04W 76/14* (2018.01)
  *H04W 76/15* (2018.01)
  *H04J 11/00* (2006.01)
  *H04W 88/04* (2009.01)
  *H04L 5/00* (2006.01)

(52) U.S. Cl.
  CPC ............ *H04L 5/0053* (2013.01); *H04W 76/14* (2018.02); *H04W 76/15* (2018.02); *H04W 88/04* (2013.01); *H04L 67/288* (2013.01)

(58) Field of Classification Search
  USPC .................... 370/310, 328, 329, 437, 465
  See application file for complete search history.

(56) References Cited

U.S. PATENT DOCUMENTS

| | | | |
|---|---|---|---|
| 8,495,244 B2* | 7/2013 | Bonar | H04B 7/0689 709/239 |
| 8,553,596 B1 | 10/2013 | Vivanco et al. | |
| 8,750,195 B2* | 6/2014 | Koo | H04B 7/15592 370/315 |
| 8,805,318 B2* | 8/2014 | Wu | H04W 4/90 455/404.1 |
| 8,943,605 B1 | 1/2015 | Martin et al. | |
| 9,301,308 B2 | 3/2016 | Seyedmehdi et al. | |
| 9,432,440 B2* | 8/2016 | Madhavan | H04L 67/06 |
| 9,642,122 B2 | 5/2017 | Seyedmehdi et al. | |
| 9,769,228 B2* | 9/2017 | Bi | H04L 65/4076 |
| 9,780,842 B2 | 10/2017 | Boudreau et al. | |
| 2005/0041618 A1 | 2/2005 | Wei et al. | |
| 2006/0153216 A1 | 7/2006 | Hosein et al. | |
| 2007/0280172 A1 | 12/2007 | Tan et al. | |
| 2008/0219222 A1 | 9/2008 | Lo et al. | |
| 2008/0235331 A1* | 9/2008 | Melamed | H04L 67/104 709/204 |
| 2010/0105404 A1 | 4/2010 | Palanki et al. | |
| 2010/0142466 A1 | 6/2010 | Palanki et al. | |
| 2010/0291940 A1 | 11/2010 | Koo et al. | |
| 2011/0032914 A1 | 2/2011 | Venkateswaran et al. | |
| 2011/0243191 A1 | 10/2011 | Nakao et al. | |
| 2011/0274188 A1 | 11/2011 | Sayana et al. | |
| 2011/0275382 A1 | 11/2011 | Hakola et al. | |
| 2012/0113816 A1 | 5/2012 | Bhattad et al. | |
| 2012/0170619 A1 | 7/2012 | Chang et al. | |
| 2012/0231739 A1 | 9/2012 | Chen et al. | |
| 2012/0282934 A1 | 11/2012 | Simonsson et al. | |
| 2012/0282966 A1 | 11/2012 | Koo et al. | |
| 2013/0029591 A1 | 1/2013 | Park et al. | |
| 2013/0157665 A1 | 6/2013 | Toda et al. | |
| 2014/0177456 A1 | 6/2014 | Boudreau et al. | |
| 2014/0177461 A1 | 6/2014 | Seyedmehdi et al. | |
| 2016/0183236 A1 | 6/2016 | Seyedmehdi et al. | |
| 2017/0005705 A1* | 1/2017 | Casselman | H04B 7/024 |

FOREIGN PATENT DOCUMENTS

| | | | |
|---|---|---|---|
| WO | 2012105167 A1 | 8/2012 | |
| WO | 2012118311 A1 | 9/2012 | |
| WO | 2014122581 A1 | 8/2014 | |

OTHER PUBLICATIONS

Author Unknown, "LTE Resource Guide," 3rd Generation Partnership Project (3GPP), Copyright: 2009, 18 pages.

Becker, Randall, "Precoding and Spatially Multiplexed MIMO in 3GPP Long-Term Evolution," Oct. 2009 High Frequency Electronics, Copyright 2009, pp. 18-26.

Holfeld, Jörg et al., "A Comp Downlink Transmission System Verified by Cellular Field Trials," 19th European Signal Processing Conference (EUSIPO 2011), Aug. 29-Sep. 2, 2011, 5 pages, Barcelona, Spain.

Tavanpour, Misagh, et al., "Shared Segmented Upload in Mobile Networks using Coordinated Multipoint," International Symposium on Performance Evaluation of Computer and Telecommunication Systems (SPECTS), Jul. 6-10, 2014, Monterey, California, IEEE, 8 pages.

Non-Final Office Action for U.S. Appl. No. 13/759,419, dated Dec. 19, 2014, 6 pages.

Notice of Allowance for U.S. Appl. No. 13/759,419, dated Jul. 17, 2015, 8 pages.

Notice of Allowance for U.S. Appl. No. 13/759,419, dated Nov. 19, 2015, 8 pages.

Non-Final Office Action for U.S. Appl. No. 15/056,582, dated Jun. 6, 2016, 9 pages.

Notice of Allowance for U.S. Appl. No. 15/056,582, dated Oct. 14, 2016, 7 pages.

Corrected Notice of Allowance for U.S. Appl. No. 15/056,582, dated Dec. 1, 2016, 2 pages.

Corrected Notice of Allowance for U.S. Appl. No. 15/056,582, dated Apr. 3, 2017, 2 pages.

Decision on Grant and Search Report for Russian Patent Application No. 2015137800, dated Aug. 23, 2016, 24 pages.

Invitation to Pay Additional Fees and Partial Search for International Patent Application No. PCT/IB2014/058788, dated May 16, 2014, 7 pages.

International Search Report and Written Opinion for International Patent Application No. PCT/IB2014/058788, dated Jul. 8, 2014, 20 pages.

Written Opinion for International Patent Application No. PCT/IB2014/058788, dated Jan. 28, 2015, 8 pages.

International Preliminary Report on Patentability for International Patent Application No. PCT/IB2014/058788, dated May 18, 2015, 11 pages.

International Search Report and Written Opinion for International Patent Application No. PCT/IB2015/054524, dated Mar. 3, 2016, 14 pages.

Non-Final Office Action for U.S. Appl. No. 13/723,841, dated Nov. 10, 2014, 16 pages.

Final Rejection for U.S. Appl. No. 13/723,841, dated Mar. 26, 2015, 16 pages.

Advisory Action and Examiner-Initiated Interview Summary for U.S. Appl. No. 13/723,841, dated May 18, 2015, 4 pages.

Non-Final Office Action for U.S. Appl. No. 13/723,841, dated Jun. 10, 2016, 18 pages.

Final Rejection for U.S. Appl. No. 13/723,841, dated Sep. 23, 2016, 19 pages.

Advisory Action and Examiner-Initiated Interview Summary for U.S. Appl. No. 13/723,841, dated Nov. 29, 2016, 4 pages.

Notice of Allowance and Fees Due for U.S. Appl. No. 13/723,841, dated Jun. 1, 2017, 10 pages.

Non-Final Office Action for U.S. Appl. No. 15/407,770, dated Jan. 2, 2018, 15 pages.

Non-Final Office Action for U.S. Appl. No. 15/407,770, dated Jul. 2, 2018, 8 pages.

\* cited by examiner

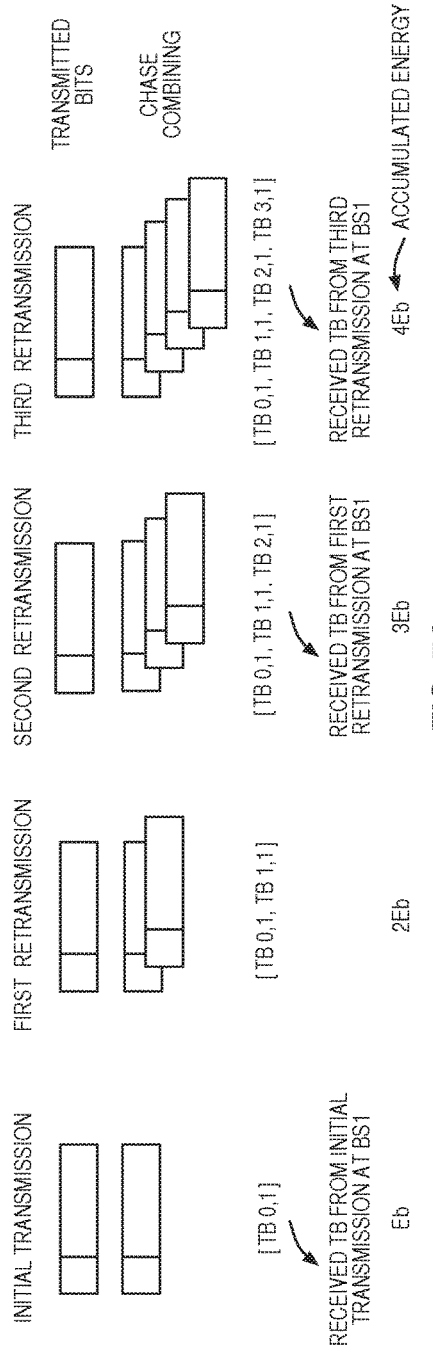
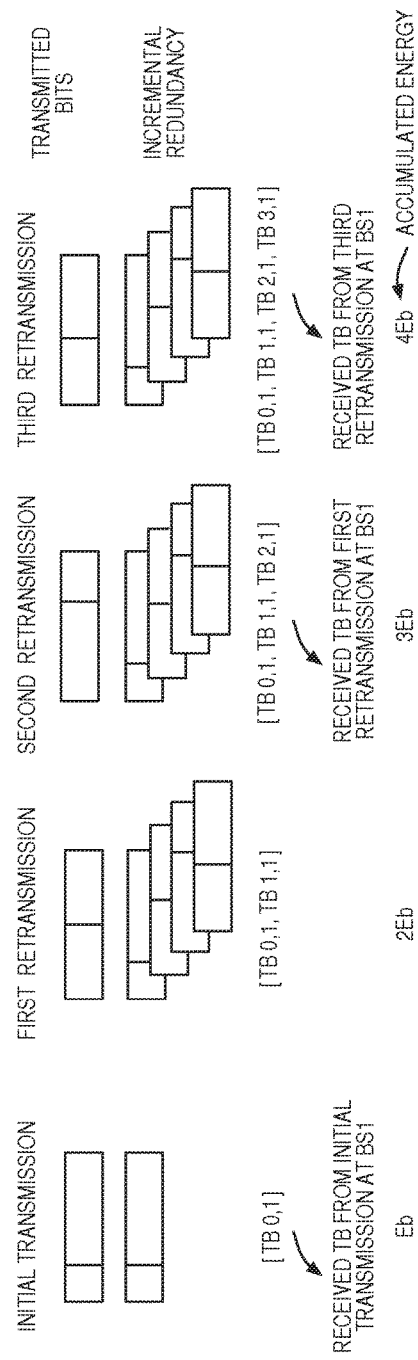

TB 0,1: RECEIVED TB FROM INITIAL TRANSMISSION AT BS1
TB 0,2: RECEIVED TB FROM INITIAL TRANSMISSION AT BS2
TB 0,3: RECEIVED TB FROM INITIAL TRANSMISSION AT BS3
FIG. 9B  
TB 1,1: RECEIVED TB FROM FIRST RETRANSMISSION AT BS1
[TB 0,1, TB 0,2, TB 0,3] + [TB 1,1]
FIG. 9C  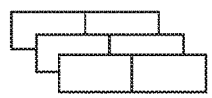
[TB 0,1, TB 0,2, TB 0,3] + [TB 1,1, TB 1,2, TB 1,3]
FIG. 9D 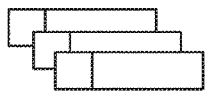 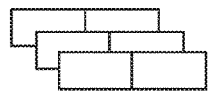 
[TB 0,1, TB 0,2, TB 0,3] + [TB 1,1, TB 1,2, TB 1,3] + [TB 2,1]
FIG. 9E 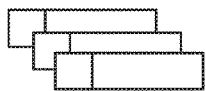 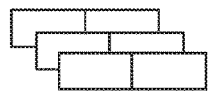 
[TB 0,1, TB 0,2, TB 0,3] + [TB 1,1, TB 1,2, TB 1,3] + [TB 2,1, TB 2,2, TB 2,3]
FIG. 9F 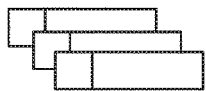 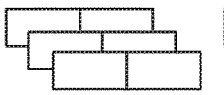 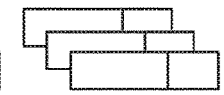 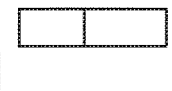
[TB 0,1, TB 0,2, TB 0,3] + [TB 1,1, TB 1,2, TB 1,3] + [TB 2,1, TB 2,2, TB 2,3] + [TB 3,1]
FIG. 9G  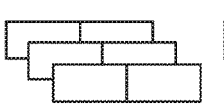  
[TB 0,1, TB 0,2, TB 0,3] + [TB 1,1, TB 1,2, TB 1,3] + [TB 2,1, TB 2,2, TB 2,3] + [TB 3,1, TB 3,2, TB 3,3]

FILE TRANSFER BY MOBILE USER COLLABORATION

This application is a 35 U.S.C. § 371 national phase filing of International Application No. PCT/IB2015/054524, filed Jun. 15, 2015, the disclosure of which is incorporated herein by reference in its entirety.

TECHNICAL FIELD

The present disclosure relates to file transfer in a wireless communications network.

BACKGROUND

The evolution of $4^{th}$ Generation (4G) wireless communications networks such as Long Term Evolution (LTE) and LTE-Advanced (LTE-A) is being driven by customer demand for higher capacity and peak throughput. A number of approaches have been developed to meet such demand. However, low data rate cell-edge users continue to pose challenges to meeting these demands. Such users tend to be interference limited. Additionally, where such users are located indoors, there may be coverage gaps that constrain performance.

Coordinated Multi-Point (CoMP) is a framework of methods to improve both peak user throughput as well as aggregated network throughput in a mobile cellular network. These methods employ multiple access points or base stations (known in the LTE environment as evolved NodeBs or eNodeBs or eNBs) grouped in a CoMP set of cooperating nodes to communicate with a wireless device (a User Equipment (UE) in LTE) of interest.

CoMP methods may be configured in either a centralized coordinated approach or through a distributed processing architecture to improve capacity. A centralized approach to CoMP where a central node or server coordinates CoMP transmissions between CoMP sets benefit from complete knowledge of the CoMP signals and context. However, such approaches rely on high capacity backhaul interconnects (e.g. via an S1 and/or X2 interface) between the base stations in the CoMP set. Centralized CoMP transmission and reception techniques use multiple transmit and receive antennas from different locations to send/receive data and to reduce signal interference to the UE. In contrast, distributed processing architectures for CoMP may achieve lower latency and reduced backhaul complexity but may experience reduced performance relative to a centralized CoMP approach.

In LTE-A, CoMP currently includes methods such as Coordinated Scheduling (CS), Coordinated Beamforming (CB), Joint Processing (JP), and Dynamic Point Selection.

In CS, the resource assignment is coordinated among multiple base stations, and transmitted/received from/to a selected base station. In CB, coordination among base stations or access points is coordinated so that their transmissions are beamformed and directed toward the UE. In downlink (DL) JP, common data is transmitted by multiple base stations and processed jointly by the UE. In uplink (UL) JP, data from the UE is provided to multiple base stations. Two challenges faced in JP, especially UL JP, are the backhaul latency and the backhaul bandwidth called for to transmit data from the receiving base stations to a single process node, which may, in some implementations, be a base station. As such, systems and methods for improved data file upload performance are needed.

SUMMARY

Systems and methods for file transfer by mobile user collaboration are provided. In some embodiments, a method of operation of a first wireless device for uploading a data file as multiple pieces to a destination network node in a wireless communications network includes dividing the data file into the multiple pieces; sending one or more pieces of the multiple pieces to one or more second wireless devices to be uploaded to the destination network node; and uploading one or more pieces via a Coordinated Multi-Point (CoMP) set of cooperating nodes in the wireless communication network. In this way, the first wireless device may be able to upload the data file to the destination network node faster than if the first wireless device uploads the entire date file directly.

In some embodiments, the method also includes, prior to sending the one or more pieces, sending an upload assistance message to the one or more second wireless devices. In response to the upload assistance message sent to the one or more second wireless devices, the method includes receiving an upload assistance confirmation message from the one or more second wireless devices and sending the one or more pieces in response to the upload assistance confirmation message received from the one or more second wireless devices.

In some embodiments, sending the upload assistance message to the one or more second wireless devices and sending the one or more pieces to the one or more second wireless devices are accomplished using Device-to-Device (D2D) communication.

In some embodiments, the method also includes creating a Data File Descriptor (DFD) which describes how the data file to be uploaded is partitioned into the multiple pieces and sending an upload request message to a serving base station of the first wireless device. In some embodiments, the method also includes, in response to sending the upload request message, receiving a handshake message from the serving base station and in response to receiving the handshake, sending a message to the serving base station including the DFD.

In some embodiments, the DFD includes an indication of a size of each of the pieces to be uploaded to the destination network node. In some embodiments, the indication of the size of each of the pieces in the DFD is an indication that the size of each of the pieces is a uniform size. In some embodiments, the indication of the size of each of the pieces in the DFD is an indication of the size of each of the pieces where the size of each of the pieces may be variable. In some embodiments, the indication of the size of each of the pieces in the DFD is an indication that the size of each of the pieces may be dynamic. In some embodiments, the DFD includes the size of each of the pieces that has been determined.

In some embodiments, sending the one or more pieces to the one or more second wireless devices to be uploaded to the destination network node also includes determining which pieces to send to the one or more second wireless devices based on one or more of the following: a number of pieces; a size of the pieces; a number of pieces the one or more second wireless devices is willing to upload; an amount of data the one or more second wireless devices is willing to upload; and/or an upload bitrate of the one or more second wireless devices.

In some embodiments, uploading the one or more pieces via the CoMP set of cooperating nodes includes receiving an upload grant from one or more cooperating nodes in the CoMP set.

In some embodiments, retransmission of the one or more pieces uploaded via the CoMP set of cooperating nodes is requested only if no node in the CoMP set correctly decoded the pieces uploaded via the CoMP set. In some embodiments, retransmission of the pieces uploaded via the CoMP set of cooperating nodes is requested only if the CoMP set cannot correctly decode the pieces uploaded via the CoMP set using a soft combination of signals received at one or more nodes in the CoMP set. In some embodiments, using the soft combination of signals received at the one or more nodes in the CoMP set includes using the soft combination of signals received at more than one node in the CoMP set.

In some embodiments, the destination network node is the serving base station of the first wireless device. In some embodiments, the destination network node is a node in a core network of the wireless communications network.

In some embodiments, a method of operation of a second wireless device for uploading a data file as multiple pieces to a destination network node in a wireless communications network includes receiving one or more pieces from a first wireless device to be uploaded to the destination network node and uploading one or more pieces to the destination network node.

In some embodiments, prior to receiving the one or more pieces, the method also includes receiving an upload assistance message from the first wireless device. In response to the upload assistance message received from the first wireless device, the method includes sending an upload assistance confirmation message to the first wireless device and receiving the one or more pieces in response to the upload assistance confirmation message sent to the first wireless device.

In some embodiments, receiving the upload assistance message from the first wireless device and receiving the one or more pieces from the first wireless device are accomplished using D2D communication.

In some embodiments, uploading the one or more pieces to the destination network node includes uploading the one or more pieces via a CoMP set of cooperating nodes in the wireless communication network. In some embodiments, retransmission of the one or more pieces uploaded via the CoMP set of cooperating nodes is requested only if no node in the CoMP set correctly decoded the one or more pieces uploaded via the CoMP set. In some embodiments, retransmission of the one or more pieces uploaded via the CoMP set of cooperating nodes is requested only if the CoMP set cannot correctly decode the one or more pieces of a plurality of pieces uploaded via the CoMP set using a soft combination of signals received at each node in the CoMP set.

In some embodiments, a method of operation of a destination network node in a wireless communications network for receiving a data file from a first wireless device as multiple pieces includes receiving an upload request message from the first wireless device; receiving one or more pieces directly or indirectly from a second wireless device; and if each of the pieces is received, using the pieces to create the data file to be uploaded.

In some embodiments, the method also includes receiving the one or more pieces from the first wireless device. In some embodiments, receiving the one or more pieces from the second wireless device includes receiving the one or more pieces from a network node that is a serving base station of the second wireless device. In some embodiments, the destination network node and the network node that is the serving base station of the second wireless device are part of a CoMP set of cooperating nodes in the wireless communication network. In some embodiments, if no node in the CoMP set correctly decodes the one or more pieces uploaded via the CoMP set, the method also includes requesting retransmission of the one or more pieces uploaded via the CoMP set of cooperating nodes.

In some embodiments, if the CoMP set cannot correctly decode the one or more pieces uploaded via the CoMP set using a soft combination of signals received at one or more nodes in the CoMP set, the method includes requesting retransmission of the one or more pieces uploaded via the CoMP set of cooperating nodes. In some embodiments, the soft combination is performed by using a Chase Combining (CC) technique. In some embodiments, the soft combination is performed by an Incremental Redundancy (IR) technique.

In some embodiments, a first wireless device is adapted to divide a data file into multiple pieces and send one or more pieces to one or more second wireless devices to be uploaded to a destination network node.

In some embodiments, a first wireless device for uploading a data file as multiple pieces to a destination network node in a wireless communications network includes an upload assistance requesting module operative to divide the data file into the pieces; a piece sending module operative to send one or more pieces to one or more second wireless devices to be uploaded to the destination network node; and an upload module operative to upload one or more pieces via a CoMP set of cooperating nodes in the wireless communication network.

In some embodiments, a first wireless device for uploading a data file as multiple pieces to a destination network node in a wireless communications network includes a processor and memory. The memory contains instructions executable by the processor whereby the device is operative to divide the data file into pieces; send one or more pieces to one or more second wireless devices to be uploaded to the destination network node; and upload one or more pieces via a CoMP set of cooperating nodes in the wireless communication network Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 7A and 7B illustrate soft combining of Transport Blocks (TBs) according to some embodiments of the present disclosure;

FIGS. 9A through 9G illustrate receiving multiple TBs at multiple BSs according to some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
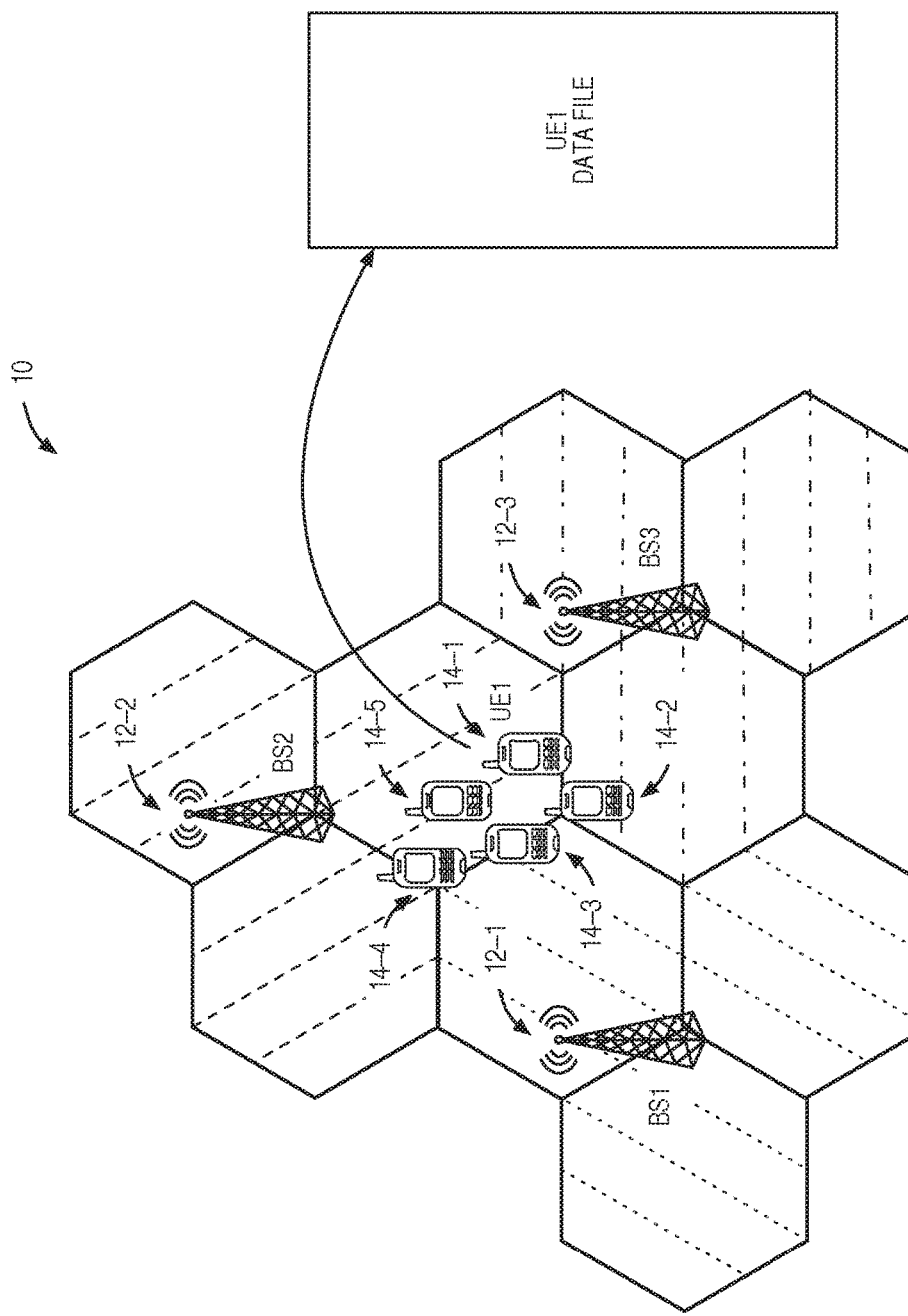
FIG. 1 illustrates a wireless communications network including multiple base stations (BSs) and multiple User Equipments (UEs) according to some embodiments of the present disclosure.

Users of a wireless communications network desire high data rates for both downloading and uploading information. Providing these high data rates can be difficult in some situations. For example, low data rate cell-edge users continue to pose challenges to meeting these demands for high data rates. Such users tend to be interference limited. Furthermore, where such users are located indoors, there may be coverage gaps that constrain performance. In order to address this and other issues, FIG. 1 illustrates a wireless communications network 10 including multiple base stations (BSs) 12-1 through 12-3 (sometimes referred to herein as BS 12 and BSs 12) and multiple User Equipments (UEs) 14-1 through 14-5 (sometimes referred to herein as UE 14 and UEs 14) according to some embodiments of the present disclosure. While the term UE is generally used herein, a UE may be any type of wireless device, which is capable of at least communication through wireless communication. Examples of such UEs are sensors, modems, smart phones, Machine Type Communication (MTC) devices also referred to as Machine-to-Machine (M2M) devices, PDAs, iPads, tablets, Laptop Embedded Equipment (LEE), Laptop Mounted Equipment (LME), USB dongles etc.

Notably, much of the discussion herein focuses on embodiments in which the wireless communications network 10 is a $3^{rd}$ Generation Partnership Project (3GPP) Long Term Evolution (LTE) cellular communications network. As such, 3GPP terminology is oftentimes used herein. However, while the embodiments described herein focus on 3GPP LTE, the embodiments and concepts disclosed herein may be used in any suitable type of existing or future cellular communications network including for example, $3^{rd}$ Generation (3G) networks (e.g. Universal Mobile Telecommunications System (UMTS)), $4^{th}$ Generation (4G) networks (Worldwide Interoperability for Microwave Access (Wi-MAX), LTE, Long Term Evolution Advanced (LTE-A)), $5^{th}$ Generation (5G) or other future networks.

In FIG. 1, each BS 12 is shown as serving three cells, for example. In this example, a first wireless device UE 14-1 has a data file that needs to be uploaded. Herein, the UE 14 that has a data file to be transferred (uploaded or downloaded) is sometimes referred to as the owner UE 14. This is not intended to imply any actual ownership of the data file or any legal relationship. In some embodiments, the owner UE 14 will have help from one or more second wireless devices such as UEs 14-2 through 14-5. Herein, a UE 14 that helps an owner UE 14 to transfer a data file is sometimes referred to as a helper UE 14.

In some embodiments, one or more of the BSs 12 are part of a Coordinated Multi-Point (CoMP) set of cooperating nodes in the wireless communications network 10. In some embodiments, one or more of the UEs 14 is able to communicate via Device-to-Device (D2D) communication as in LTE implementations, and/or is able to communicate via other wireless technologies. Examples of non-LTE wireless technologies include variants of the IEEE 802.11 standards suite, such as Wi-Fi and Wi-Fi Direct, as well as Bluetooth, Zigbee, cordless phone technologies, or the like. Systems based on these technologies may operate in an unlicensed spectrum.

Recently, D2D communications as an underlay to cellular networks have been proposed as a method for taking advantage of the proximity of communicating devices and at the same time to allowing devices to operate in a controlled interference environment. This is referred to as network-assisted D2D communication. Typically, it is suggested that such D2D communication shares the same spectrum as the cellular system, for example by reserving some of the cellular uplink resources for D2D purposes. Devices that want to communicate, or even just discover each other, typically need to transmit various forms of signaling. One example of such signaling is the so-called discovery signal (which may possibly include a full message), which at least carries some form of identity and is transmitted by a device that wants to be discoverable by other devices. Other devices can scan for the discovery signals. Once they have detected the discovery signal, they can take the appropriate action, for example trying to initiate a connection setup with the device transmitting the discovery message.

Figure 2:
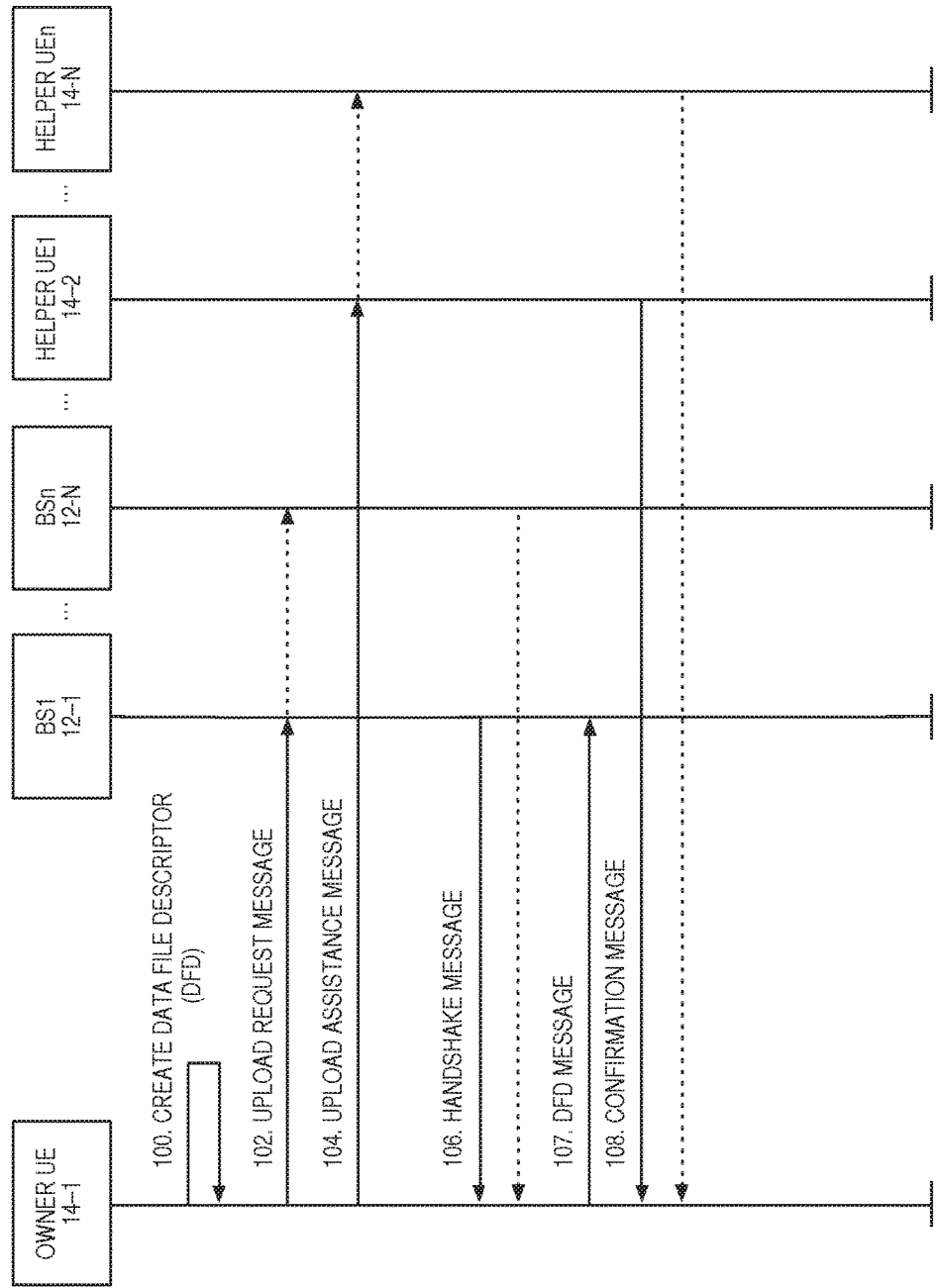
FIG. 2 is a flow chart illustrating a process for initiating a data file upload by an owner UE according to some embodiments of the present disclosure.

While not limited thereto, the owner UE 14 may communicate with one or more helper UEs 14 via D2D communication to help upload a data file. One embodiment of this for the wireless communications network 10 of FIG. 1 is shown in FIG. 2, which is a flow chart illustrating a process for initiating a data file upload by an owner UE 14-1 according to some embodiments of the present disclosure. In this embodiment, owner UE 14-1 creates a Data File Descriptor (DFD) (step 100). Generally, a DFD describes the data file to be uploaded, and several examples of a DFD will be discussed below. The owner UE 14-1 should construct a DFD which indicates how the target file to be uploaded is partitioned into pieces for the upload process. One of the fields in the DFD is piece length or size. With respect to this file piece size, three different embodiments are envisioned.

In a first embodiment, all the pieces of the file are the same size referred to as a Uniform Piece Size (UPS). In order to determine the piece size, at least (but not limited to) two factors are considered by the owner UE 14-1: the total file size, and the quality of the communication in the channel between the owner UE 14-1 and its serving BS 12. As one example, in an LTE system, channel quality can be based on SINR as measured by an RSRP or RSRQ type measurement on the Sounding Reference Symbol (SRS) on the uplink. One important point to consider is that very small piece sizes may lead to too many pieces and this may impose an unnecessary overhead onto the network. On the other hand, the problem with the very large pieces is that it may be difficult to send them in a reasonable number of segments, since larger pieces will need to be divided into lots of segments in the lower layers of the LTE protocol architecture. A trade-off between the data file size and communication channel quality and the piece size is considered. The current assumption for the smallest and the largest piece size regardless of the data file size is 128 Kbyte (KB) and 2048 KB, respectively. However, the present disclosure is not limited thereto. The piece size in the current assumption can be one of the following numbers in KB: 128, 256, 512, 1024 and 2048. As Table 1 shows, the DFD file size is small enough (it includes 6 numbers and a file name) that the owner UE 14-1 can easily upload the DFD to its serving BS 12. In one embodiment, the owner UE 14-1 determines the piece size solely before uploading the file independent of the number of helper UEs 14. The DFD pertaining to this mode has the fields described in the following table:

TABLE 1

Fixed Piece Size DFD Message Content

| | Field Name | Field Type | Value |
|---|---|---|---|
| 1 | Message ID | Integer (Unitless) | 11 |
| 2 | Data File Name | String | |
| 3 | Data File Size | Float(In MB) | |
| 4 | Piece Size | Integer (In KB) | |
| 5 | Last Piece Size | Integer (In KB) | |
| 6 | Number of the Pieces | Integer (Unitless) | |
| 7 | Owner UE ID | Integer (Unitless) | |

In another embodiment referred to as a Variable Piece Size (VPS), the owner UE 14-1 considers multiple piece sizes and divides the data file based on these sizes. During the upload process and after receiving a confirmation message from the helper UEs 14 (discussed in detail below), the owner UE 14-1 sends larger pieces to the helper UEs 14 with a larger preferred piece size or a larger upload data rate. The owner UE 14-1 sends smaller pieces to the helper UEs 14 with lower preferred piece size or lower upload data rate. To do so, the owner UE 14-1 should announce different sizes of the pieces in DFD file, and the helper UEs 14 select their preferred piece size based on their current condition. They let the owner UE 14-1 know about their decision by using the confirmation message. Table 2 shows the content of DFD for VPS approach:

TABLE 2

Variable Piece Size DFD Message Content

| | Field Name | Field Type | Value |
|---|---|---|---|
| 1 | Message ID | Integer (Unitless) | 12 |
| 2 | Data File Name | String | |
| 3 | Data File Size | Float (In MB) | |
| 4 | Piece Size | Integer Array (In KB) | |
| 5 | Number of the Pieces | Integer (Unitless) | |
| 6 | Owner UE ID | Integer (Unitless) | |

In a third embodiment referred to as Dynamic Piece Size (DPS), the owner UE 14-1 determines the piece size during the transfer process based on a number of criteria. These criteria may include, but are not limited to, the simultaneous channel quality of the owner UE 14-1 and the helper UEs 14. Therefore, the number of pieces is not known at the owner UE 14-1 until the file transfer procedure is completed. Table 3 defines the DFD message structure for this approach.

TABLE 3

Dynamic Piece Size DFD Message Content

| | Field Name | Field Type | Value |
|---|---|---|---|
| 1 | Message ID | Integer (Unitless) | 13 |
| 2 | Data File Name | String | |
| 3 | Data File Size | Float (In MB) | |
| 4 | Owner UE ID | Integer (Unitless) | |

As can be seen in Tables 1 through 3, there are differences among the structure of the DFD messages for these three methods. It should also be noted that these are only examples for a DFD message, and this disclosure is not limited thereto. In UPS approach, there is just one piece size, and based on this selected piece size, the owner UE 14-1 knows that the data file is divided into how many pieces. The same situation is valid for VPS method except for the fact that in VPS, the owner UE 14-1 uses more than one piece size. In both cases, the owner UE 14-1 knows the number of the pieces and the length of each piece before starting the upload phase. Therefore, the owner UE 14-1 can insert this information to the related DFD message and then send it for the BSs 12 in the CoMP set. The serving BS 12 can use the same DFD message to check the correct reception of all the pieces at the end of the upload.

In case of DPS, the owner UE 14-1 does not know the piece size prior to the upload process. Therefore, the owner UE 14-1 does not know how many pieces are required to upload the whole data file. When the owner UE 14-1 starts to upload the data file, it determines each piece size, for instance, based on its communication channel condition to the BS 12 at the time of transmitting to the network. In addition, when the owner UE 14-1 wants to send a part of the data to the helper UE 14, it may determine the piece size based on the provided information from helper UEs 14. As a result, at the beginning of the upload process (before the owner UE 14-1 starts to send the pieces), the owner UE 14-1 sends the DFD message of DPS mode as defined in Table 3 above to the BSs 12 in the CoMP set. As can be seen, there is no information about the pieces inside this message structure. During the upload process (when the owner UE 14-1 starts to create the pieces and send them), it completes the DFD message by inserting the information of each piece (piece number, piece size, the first byte address in the data file, the last byte address in the data file), for example. At the end of the upload process (after all the pieces are transmitted), the owner UE 14-1 sends the final version of the DFD message (the one that has all the information about all the pieces) for the BSs 12 in the CoMP set. The serving BS 12 uses this version of the DFD message to determine if there are any differences between the control information of received pieces and their control information in final DFD. This process enables the serving BS 12 to perform the proper action in the case of an error condition.

Returning now to FIG. 2, the owner UE 14-1 then sends an upload request message to one or more BSs 12 (step 102). This message may be transmitted to more than one BS 12, for example, if the BSs 12 are part of a CoMP set. Note that in addition to the legacy LTE feature of a UE 14 requesting resources from its serving BS 12, the owner UE 14-1 may also be able to request resources from the cooperating BSs 12 in the CoMP set. These BSs 12 cooperate with each other to support the owner UE 14-1 upload process. Table 4 below shows an example upload request message:

TABLE 4

Upload Request Message Definition

| | Field Name | Field Type | Value |
|---|---|---|---|
| 1 | Message ID | Integer (Unitless) | 21 |
| 2 | UE ID | Integer (Unitless) | |
| 3 | Serving BS ID | Integer (Unitless) | |
| 4 | Data File Size | Float(In MB) | |

The owner UE 14-1 then sends an upload assistance message to one or more helper UEs 14 (step 104). Table 5 below illustrates a possible corresponding upload assistant message structure for the UPS and VPS methods:

TABLE 5

Upload Assistant Message definition (UPS and VPS)

| | Field Name | Field Type | Value |
|---|---|---|---|
| 1 | Message ID | Integer (Unitless) | 22 |
| 2 | Owner UE ID | Integer (Unitless) | |
| 3 | Serving BS ID | Integer (Unitless) | |
| 4 | Data File Name | String | |
| 5 | Data File Size | Float(In MB) | |
| 6 | Piece Size | Integer Array (In KB) | |
| 7 | Number of the Pieces | Integer (Unitless) | |

In case of DPS, the upload assistance message structure does not require the last two fields of Table 5 (piece size and number of the pieces). The reason is that in the DPS method, the owner UE 14-1 does not have any information about the pieces prior to the actual upload of the pieces. A possible upload assistance message structure for the DPS method is illustrated in Table 6 below:

TABLE 6

Upload Assistant Message definition (DPS)

| | Field Name | Field Type | Value |
|---|---|---|---|
| 1 | Message ID | Integer (Unitless) | 23 |
| 2 | Owner UE ID | Integer (Unitless) | |
| 3 | Serving BS ID | Integer (Unitless) | |

TABLE 6-continued

Upload Assistant Message definition (DPS)

| | Field Name | Field Type | Value |
|---|---|---|---|
| 4 | Data File Name | String | |
| 5 | Data File Size | Float (In Mb) | |

The owner UE 14-1 may receive a handshake message from the one or more BSs 12 (step 106). Depending on the implementation, these handshake messages may include information related to uplink scheduling resources, the BSs 12 that are part of a CoMP set, et cetera. In some embodiments, the handshake message may be similar to the one provided in Table 7:

TABLE 7

UE Upload Handshake Message

| | Field Name | Field Type | Value |
|---|---|---|---|
| 1 | Message ID | Integer (Unitless) | 31 |
| 2 | Owner UE ID | Integer (Unitless) | |
| 3 | Serving BS ID | Integer (Unitless) | |
| 4 | Data File Name | String | |
| 5 | Data File Size | Float (In MB) | |

The owner UE 14-1 sends the DFD message to its serving BS 12-1 (step 107).

The owner UE 14-1 then receives one or more confirmation messages from the one or more helper UEs 14 (step 108). These messages may indicate whether or not a particular helper UE 14 is willing to help the owner UE 14-1 upload the data file. As used herein, being willing to help indicates willing and able to help. These messages may also contain information regarding the number and/or size of the pieces the helper UE 14 is willing to help with, along with information such as a physical location of the helper UE 14 or an upload bit rate or channel quality indication. Helper UEs 14 can voluntarily or by instruction from a BS 12 listen to the upload assistance request message from the owner UE 14-1. If a candidate helper UE 14 is capable of assisting the owner UE 14-1, it transmits the confirmation message to the owner UE 14-1.

There are a number of parameters that a helper UE 14 can use to announce itself as a potential helper, including: the communication channel condition, the remaining battery life of the helper UE 14, security issues, and service provider rewards or incentives for the helper UE 14, for example.

In the UPS method, the helper UE 14 informs owner UE 14-1 of the maximum number of the pieces that the helper UE 14 can accept (based on the piece size in the upload assistance message). It should be noted that in this embodiment it is assumed that neither the BSs 12 nor the helper UEs 14 have any part of the data file, but in other embodiments, they could have part of the data file and they may let the owner UE 14-1 know which part of the data file is available to them. The following table shows a possible message structure of the Confirmation message in the UPS method. Note that the value of the fourth field of this message (list of the available pieces) is always NULL in this example:

TABLE 8

Helper UE Confirmation Message (UPS)

| | Field Name | Field Type | Value |
|---|---|---|---|
| 1 | Message ID | Integer (Unitless) | 32 |
| 2 | Helper UE ID | Integer (Unitless) | |
| 3 | Max Number of the Pieces | Integer (Unitless) | |
| 4 | List of the Available Pieces | Array(Integer) | |
| 5 | Estimation of Upload Data Rate | Integer (Mbps) | |

In the case of using either the VPS or DPS methods, the helper UE 14 may use the following table as the confirmation message structure. In both cases, the helper UEs 14 define their preferred piece size based on the previously described criteria. Upon receiving the helper confirmation message, the owner UE 14-1 sends one or more pieces of the data file, such that each piece size is equal to or less than the preferred piece size defined for the helper UE 14. Again, if there is any available piece of the same data file to be uploaded at the helper UE 14, it may insert the address of the first byte and the last byte of the available pieces into the confirmation message as well. This aids the owner UE 14-1 in determining which part of the data file is already available at the helper UE 14. A possible confirmation message in VPS or DPS is shown in Table 9:

TABLE 9

Helper UE Confirmation Message (VPS or DPS)

| | Field Name | Field Type | Value |
|---|---|---|---|
| 1 | Message ID | Integer (Unitless) | 33 |
| 2 | Helper UE ID | Integer (Unitless) | |
| 3 | Max Data Size Offer to Help in Upload | Integer (In KB) | |
| 4 | Preferred Piece Size | Integer (In KB) | |
| 5 | Estimation of Upload Data Rate | Integer (Mbps) | |
| 6 | Address of First and Last Bytes of the Available Pieces in Data File | Array (Integer) | |

While the messages of FIG. 2 are shown in a particular order, this disclosure is not limited thereto. For instance, the owner UE 14-1 may receive a handshake message from the one or more BSs 12 before sending an upload assistance message to the one or more helper UEs 14.

Helper UEs 14 able to assist the owner UE 14-1 and selected for assistance (such as by the owner UE 14-1) are also sending upload request messages to the one or more BSs 12 (step not shown). These upload request messages may be similar to the upload request message from the owner UE 14-1 to the BS 12, shown in step 102.

Figure 3:
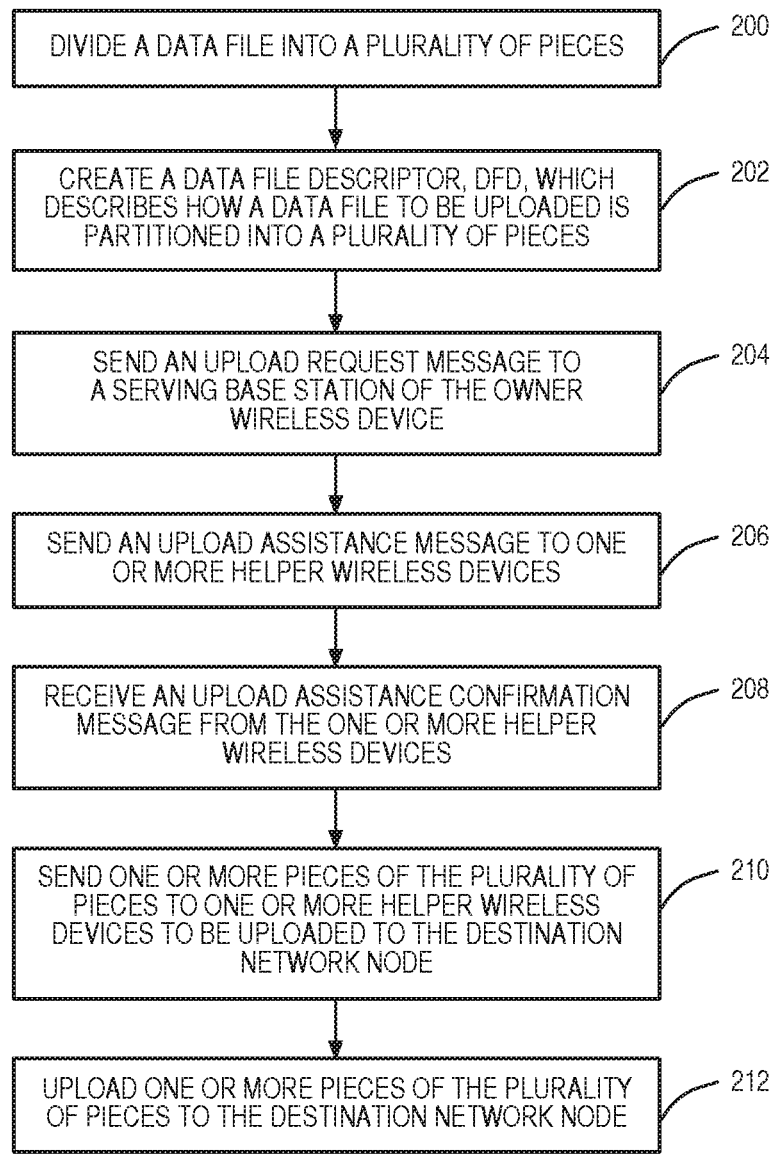
FIG. 3 is a flow chart illustrating a process performed by the owner UE according to some embodiments of the present disclosure.

FIG. 3 is a flow chart illustrating a process performed by the owner UE 14-1 according to some embodiments of the present disclosure. The owner UE 14-1 divides a data file to be uploaded into a plurality of pieces (step 200). The owner UE 14-1 then creates a DFD which describes how the data file to be uploaded is partitioned into a plurality of pieces (step 202). The owner UE 14-1 sends an upload request message to a serving BS 12 of the owner UE 14-1 (step 204) and sends an upload assistance message to one or more helper UEs 14 (step 206). Depending on the embodiment, steps 204 and 206 may be performed in a different order or may be performed in parallel.

The owner UE 14-1 receives an upload assistance confirmation message from one or more of the helper UEs 14 (step 208) and, in response, sends one or more pieces of the plurality of pieces to the one or more helper UE 14 to be uploaded to the destination network node (step 210). The owner UE 14-1 then optionally uploads one or more pieces of the plurality of pieces to the destination network node (step 212). In some embodiments, the destination network node is the serving BS of the owner UE 14-1. In other embodiments, the destination network node is a node in a core network of the wireless communications network 10 such as a Mobility Management Entity (MME) 16. In some embodiments, the destination network node, such as the MME 16, is reached indirectly via one or more intermediate destination network nodes.

Figure 4:
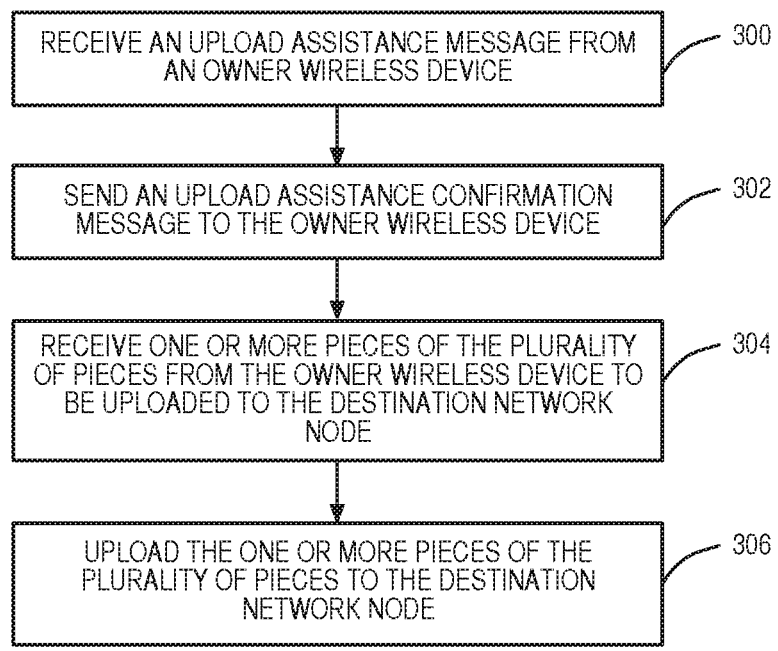
FIG. 4 is a flow chart illustrating a process performed by a helper UE according to some embodiments of the present disclosure.

FIG. 4 is a flow chart illustrating a process performed by a helper UE 14 according to some embodiments of the present disclosure. The helper UE 14 receives an upload assistance message from an owner UE 14-1 (step 300). If willing to help, the helper UE 14 sends an upload assistance confirmation message to the owner UE 14-1 (step 302). The helper UE 14 receives one or more pieces of the plurality of pieces from the owner UE 14-1 to be uploaded to the destination network node (step 306) and uploads the one or more pieces of the plurality of pieces to the destination network node (step 306).

Figure 5:
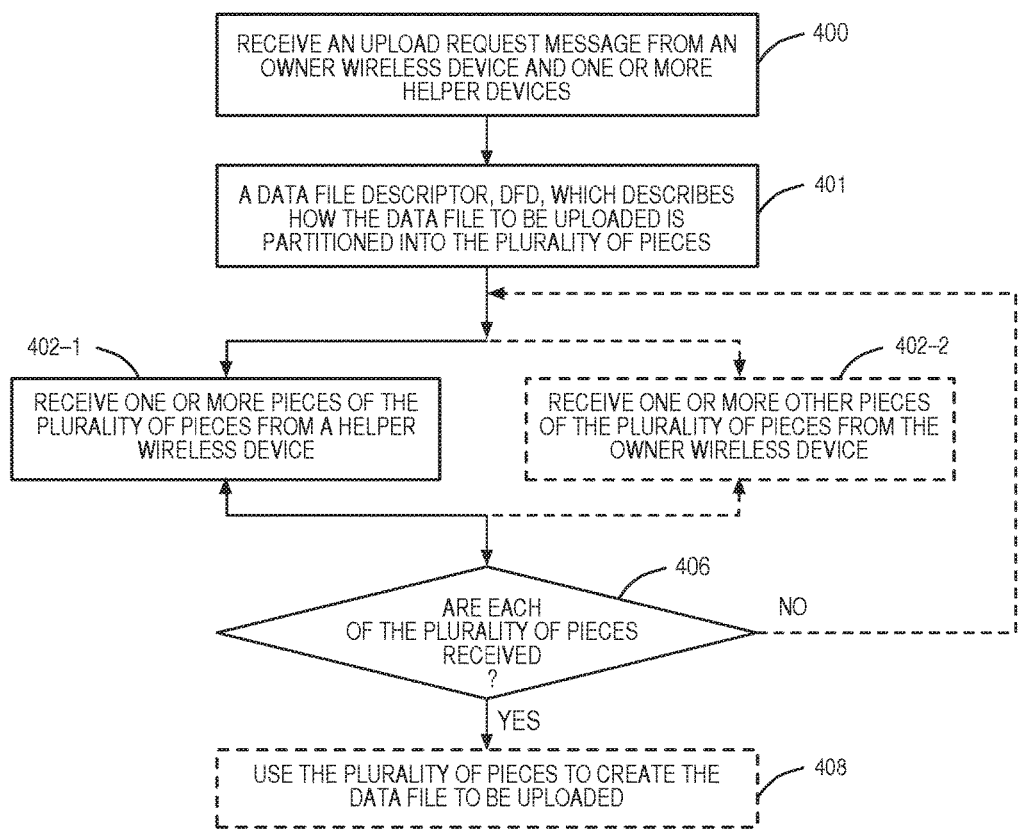
FIG. 5 is a flow chart illustrating a process performed by a BS according to some embodiments of the present disclosure.

FIG. 5 is a flow chart illustrating a process performed by a BS 12 according to some embodiments of the present disclosure. The BS 12 receives an upload request message from an owner UE 14-1 and one or more helper UEs (14-2, 14-N) (step 400). Optionally, upon receiving the upload request message from the owner and helper UEs 14, BS 12 sends a handshake message to all the UEs 14 requesting upload, indicating that the BS 12 can support the upload (step not shown). Next, the BS 12 receives a DFD from the owner UE 14-1 (step 401). The DFD describes how the data file to be uploaded is partitioned into a plurality of pieces. The upload request message from the owner UE 14-1 and the DFD information may be included in several messages exchanged between the BS 12 and the owner UE 14s as shown in FIG. 2, for example, or may all be included in a single message sent from the owner UE 14-1. The BS 12 receives one or more pieces of the plurality of pieces from one or more helper UEs 14 (step 402-1). Optionally, the BS 12 receives one or more other pieces of the plurality of pieces from the owner UE (step 402-2). The one or more other pieces of the plurality of pieces, or remaining pieces of the plurality of pieces, are pieces from the plurality of pieces not received by the BS 12 from any helper UEs 14. In some embodiments, the BS 12 may also receive one or more pieces of the plurality of pieces from any combination of one or more serving BS 12 of the respective one or more helper UEs 14, one or more non-serving BSs 12 of the one or more helper UEs 14 and one or more non-serving BSs 12 of the owner UE 14-1.

In some embodiments, the destination network node is some other network node, such as a node in the core network, for example MME 16. In this case, the BS 12 forwards the received pieces to this other network node. In another embodiment, the BS 12 itself is the destination network node, and then the data file has arrived in the correct location. According to some further embodiments, in all these scenarios, the BS 12 determines if each of the plurality of pieces has been received (step 406). If not all of the pieces have been received, the process optionally returns to a point in the flow prior to steps 402-1 and 402-2 to receive more pieces. If all of the pieces have been received, the destination network node (which, as noted, can be either BS 12 or another network node), uses the plurality of pieces to create the data file to be uploaded (step 408). As the destination network node is not necessarily BS 12, step 408 is optional when FIG. 5 relates to steps performed at BS 12.

Figure 6A:
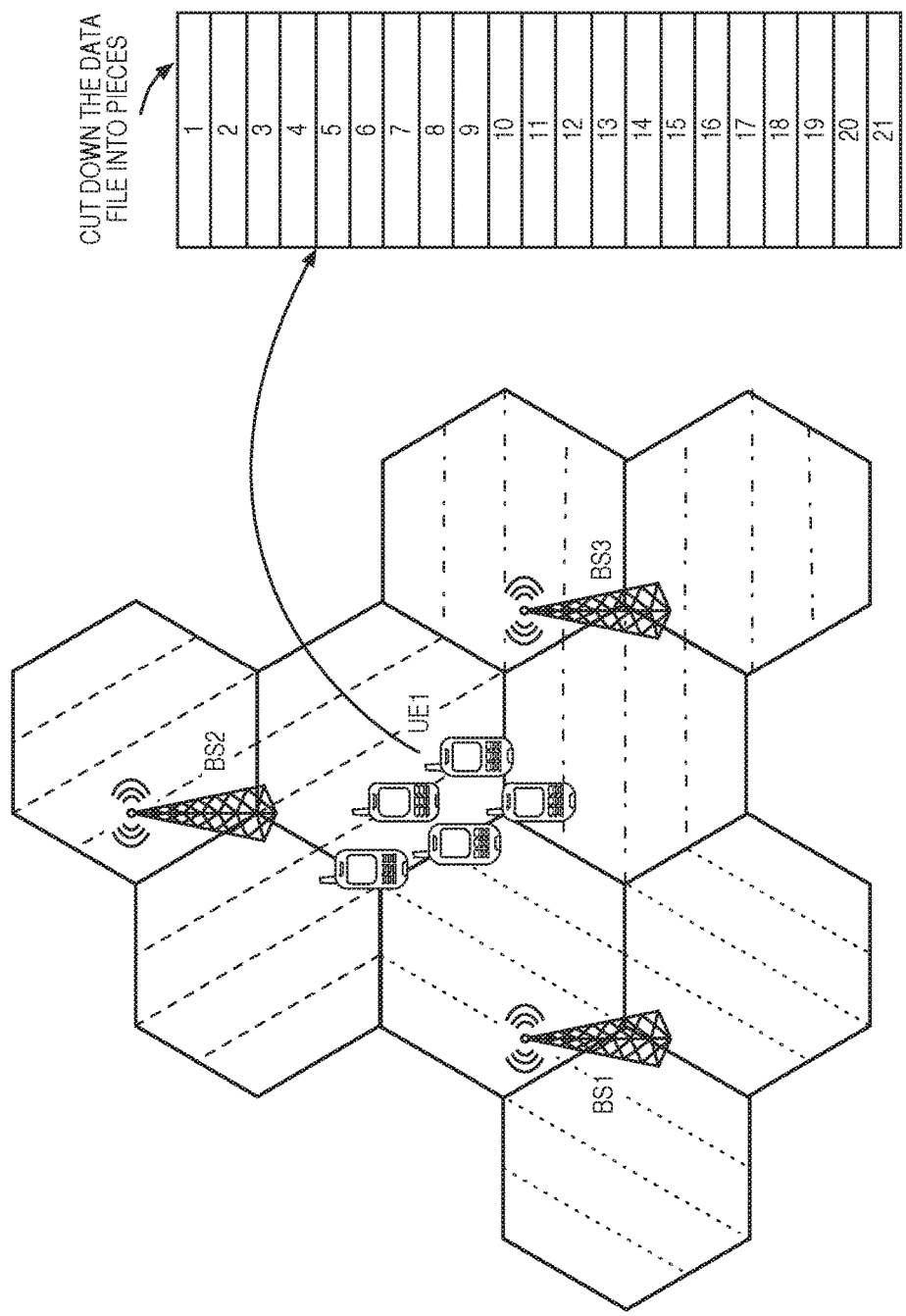
FIGS. 6A through 6C illustrate an interaction between multiple UEs for uploading a data file according to some embodiments of the present disclosure.
Figure 6B:
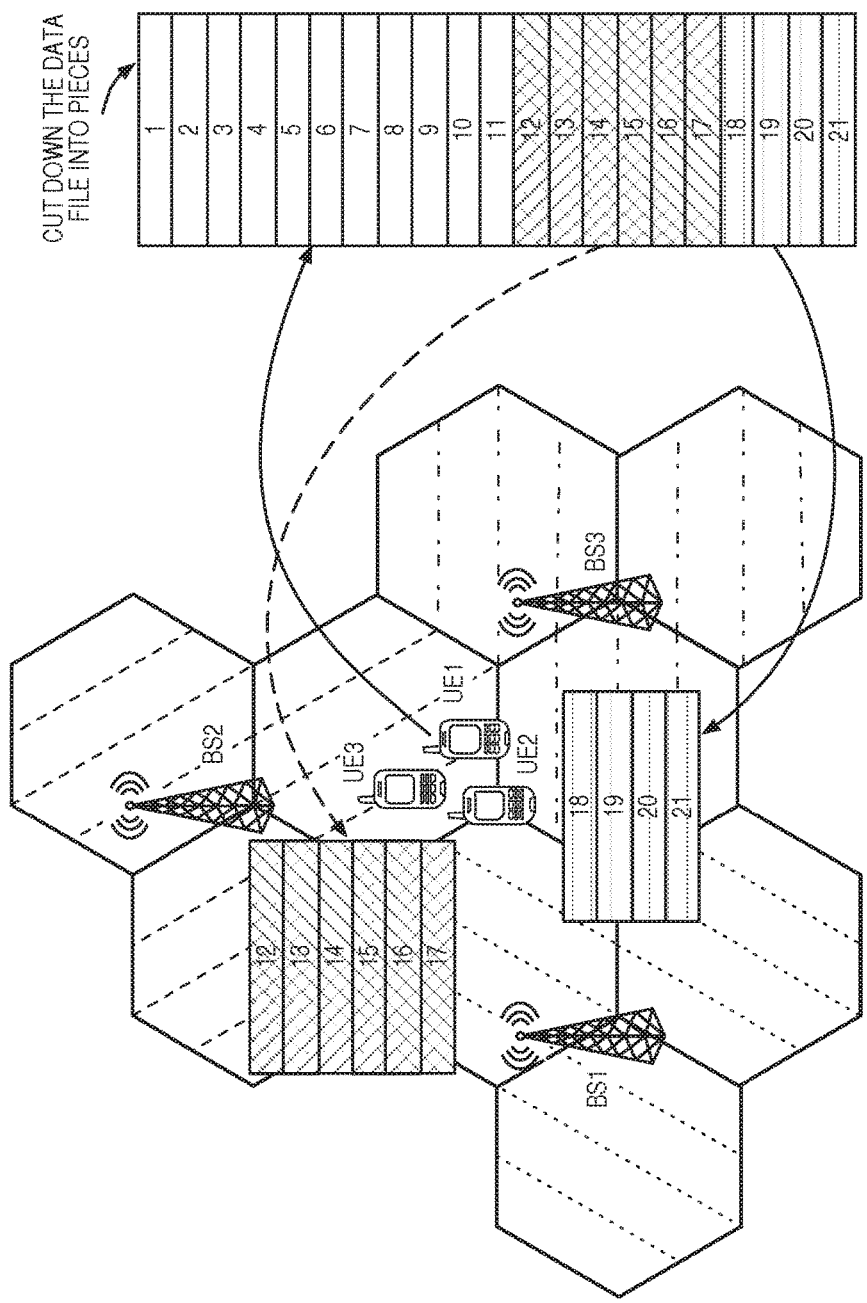
Figure 6C:
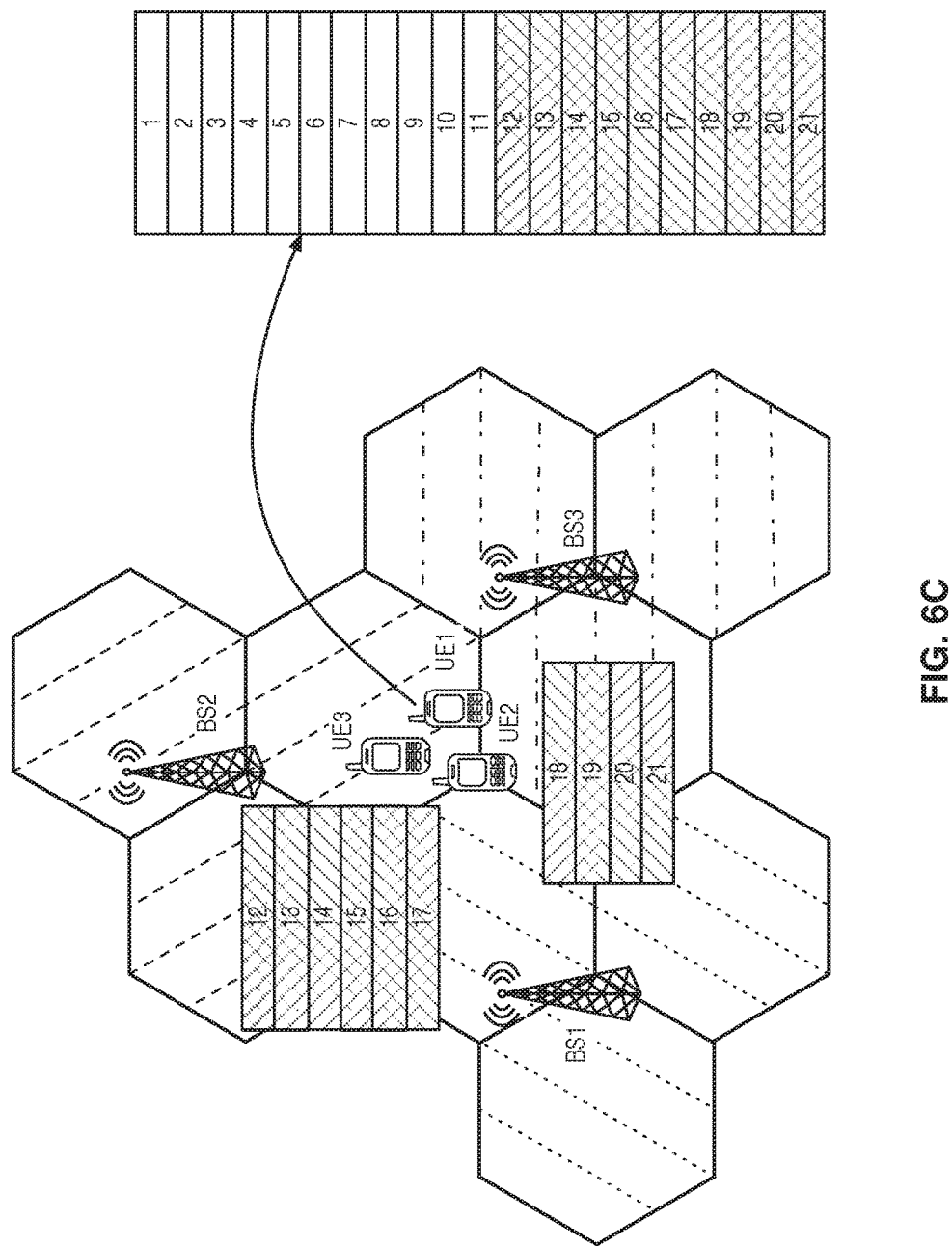
Figure 8A:
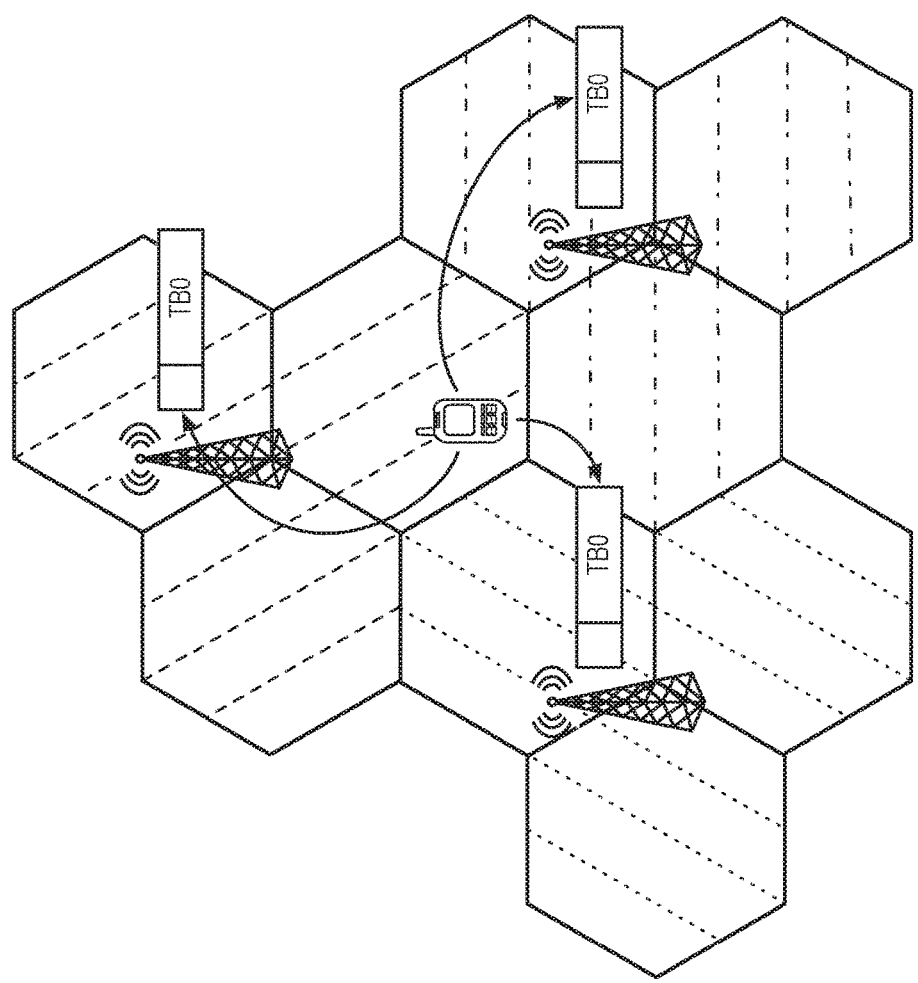
FIGS. 8A through 8D illustrate an interaction between multiple BSs according to some embodiments of the present disclosure.
Figure 8B:
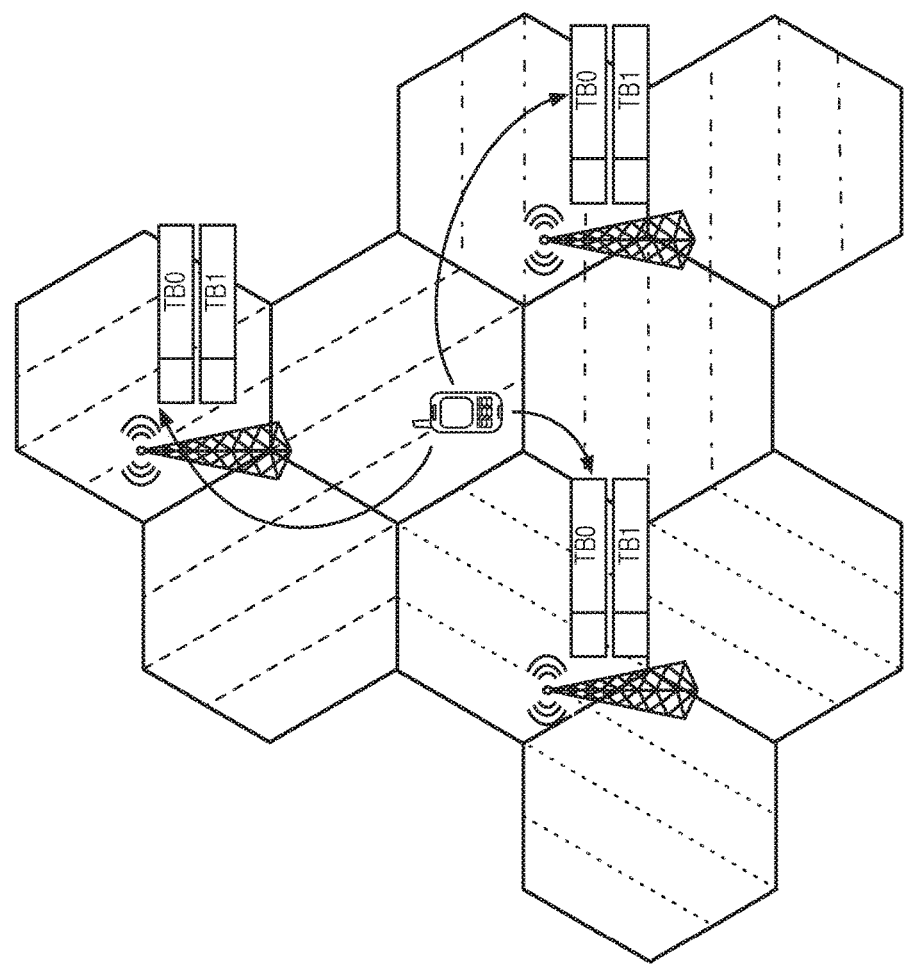
Figure 8C:
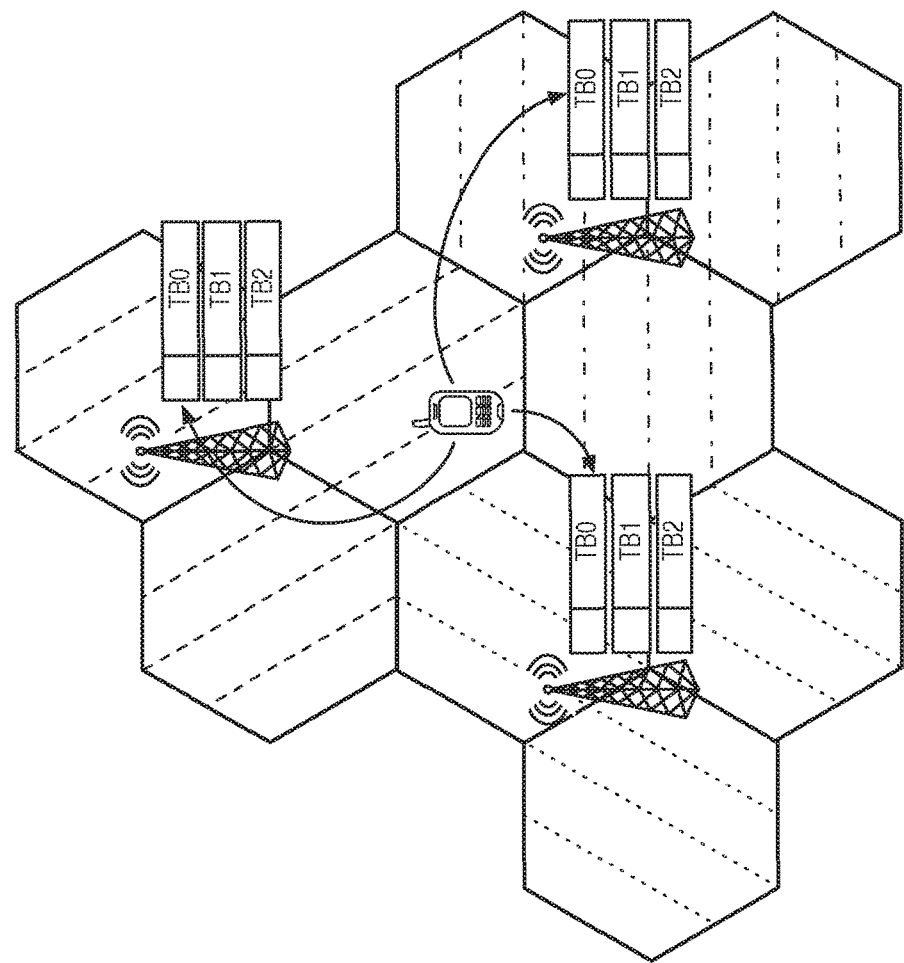
Figure 8D:
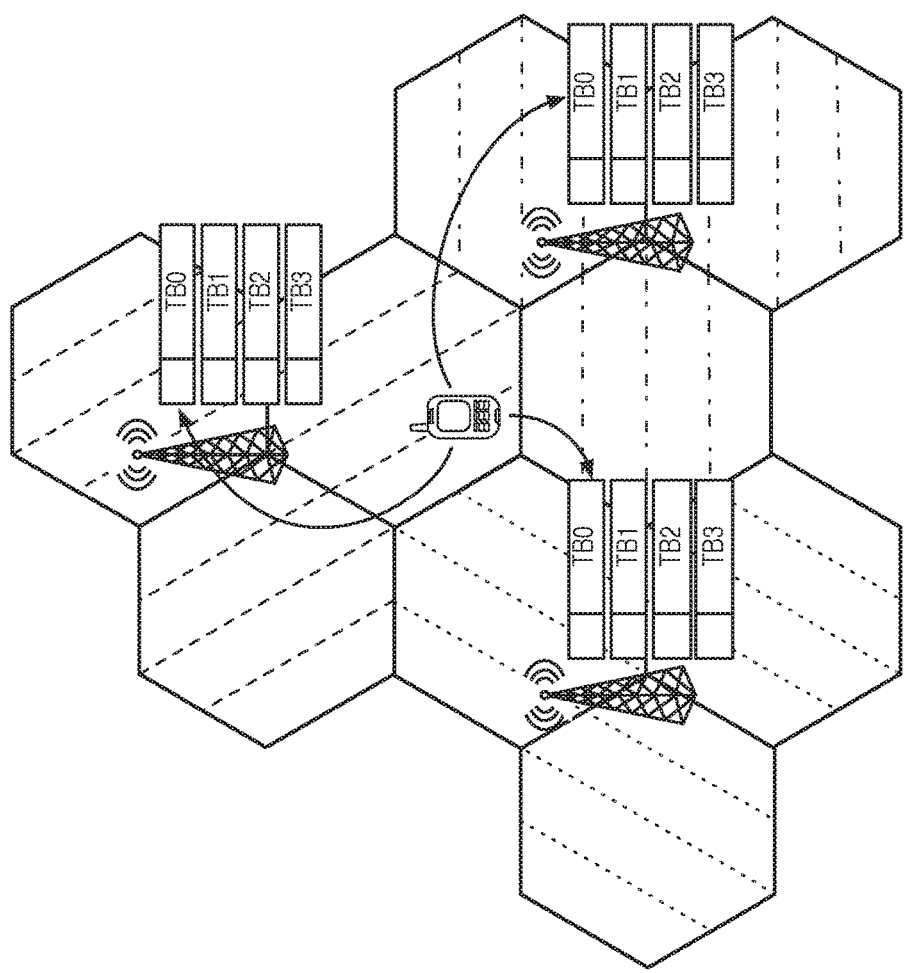

FIGS. 6A through 6C illustrate an interaction between multiple UEs 14 for uploading a data file according to some embodiments of the present disclosure. In this example, FIG. 6A shows that the data file is divided into 21 pieces by the owner UE 14-1. These pieces may conform to any of the methods disclosed above such as UPS, VPS, or DPS. FIG. 6B shows that pieces 18 through 21 have been sent to helper UE 14-2 and pieces 12 through 17 have been sent to UE 14-3. As discussed above, the determination regarding how many pieces and which size pieces (when applicable) may be based on several criteria such as channel quality between a helper UE 14 and its serving BS 12. FIG. 6C shows the helper UE 14-2 and helper UE 14-3 have uploaded their assigned pieces and owner UE 14-1 has uploaded (or still needs to upload) the remaining pieces 1 through 11.

After determining the DFD, the UEs 14 start to send their pieces to the BSs 12 in the CoMP set. Both owner UEs 14 and helpers UEs 14 send their pieces to the BSs 12 within range. Table 10 shows a possible structure of the message that the UEs 14 use in the UPS, VPS and DPS methods to send their pieces for the BSs 12. When the BSs 12 receive a piece message, they save the piece data. In addition, the BSs 12 save control information about the received data file and its pieces (including the data file name, data file size, number of the pieces, and which pieces are available at the BS 12). This information aids the BSs 12 in preventing future uploading of the same data by the other UEs 14.

Note that in some embodiments there is no guarantee that in future uploads that the UEs 14 will use the same piece length to upload the same data file. Therefore the piece number is not a good metric to provide information about the available data parts at the BSs 12. A better solution is to use the address of the first and the last byte of the piece in the data file. This information can assist the UEs 14 to understand which part of the data file is already available at the BS side.

If an owner UE 14-1 uploads a piece, the owner UE id and the sender UE id will be the same in the related piece message structure. Otherwise, if a helper UE 14 uploads a piece then the sender UE id will be the id of this helper UE. In addition, if the UEs 14 implement the DPS method, the owner UE 14-1 updates the DFD after creating each piece message in some embodiments.

TABLE 10

Structure of Piece Messages

| | Field Name | Field Type | Value |
|---|---|---|---|
| 1 | Message ID | Integer (Unitless) | 41 |
| 2 | Owner UE ID | Integer (Unitless) | |
| 3 | Sender UE ID | Integer (Unitless) | |
| 4 | Data File Name | String | |
| 5 | Pieces Number | Integer (Unitless) | |
| 6 | First Byte Address | Integer (Unitless) | |
| 7 | Last Byte Address | Integer (Unitless) | |
| 8 | Data Load | | |

By receiving a confirmation message from a helper UE 14, the owner UE 14-1 will need to decide whether it will employ that helper UE 14 or not. This decision can be made based on different factors including the quality of the communication channel between the owner UE 14-1 and the helper UE 14 and the number of helper UEs 14. Upon selection of the helper UEs 14, the owner UE 14-1 sends a number of pieces to the helper UE 14. The number of pieces is determined based on the information in the confirmation message. The owner UE 14-1 keeps track of the pieces that are assigned to each helper UE 14. In addition, if the DPS method is being employed, the owner UE 14-1 may update the DFD after creating each piece message or after some number or piece messages are created. Table 11 shows a possible message structure that the owner UE 14-1 may use in the UPS, VPS and DPS methods to send pieces to the helper UEs 14.

TABLE 11

The piece message structure for a UE-to-UE communication in UPS, VPS, and DPS

| | Field Name | Field Type | Value |
|---|---|---|---|
| 1 | Message ID | Integer (Unitless) | 51 |
| 2 | Owner UE ID | Integer (Unitless) | |
| 3 | Serving BS ID | Integer (Unitless) | |
| 4 | Data File Name | String | |
| 5 | Pieces Number | Integer (Unitless) | |
| 6 | First Byte Address | Integer (Unitless) | |
| 7 | Last Byte Address | Integer (Unitless) | |
| 8 | Data Load | | |

After a piece is uploaded to one or more BSs 12, it must be determined if the data was received correctly. Error checking may be performed at three different levels. The receivers (the BSs 12 in the CoMP set of a certain UE 14) perform the first two error checking steps in the Media Access Control (MAC) and Radio Link Control (RLC) layers of LTE protocol stack. The serving BS 12 performs the last and highest level of error checking at the end of the upload process in the upper layers of LTE protocol stack. The MAC and RLC layers are responsible for the first and second levels of error checking, respectively. To discuss the retransmission process in the MAC layer, it is necessary to know that the RLC layer dynamically divides the pieces that it receives from Packet Data Convergence Protocol (PDCP) layer into a number of segments (known as RLC Protocol Data Units (PDUs)) based on the contemporary communication channel condition. The MAC layer then uses the RLC PDUs and MAC headers to form Transport Blocks (TBs), again based on the contemporary communication channel condition. Therefore, the data unit in the MAC layer is the TB.

There may be a number of BSs 12 which form the CoMP coordination set to support a UE 14 upload. It is important to mention that the serving BS 12 is usually the only BS 12 in the CoMP set that sends control messages such as Acknowledgement (ACK) or Negative Acknowledgement (NACK) for the UE 14. In addition, the non-serving BSs 12 usually send a feedback to the serving BS 12 when they receive a TB. For example, FIG. 1 shows a CoMP set of three BSs 12 supporting a UE 14 upload. In this example, BS 12-1 is the serving BS 12, and BS 12-2 and BS 12-3 are the non-serving BSs 12 of the CoMP coordination set. When the UE 14 transmits its TB in the upload process, one of the following two situations can happen at the BS 12 receivers. Either the TB does not need to be retransmitted, or it does need to be retransmitted.

In the following three situations, the serving BS 12 does not need to send a retransmission request to the UE 14, because at least one of the BSs 12 in the CoMP set is able to recover data from the received TB:

1. All the BSs 12 of the CoMP set receive the transmitted TB without error. As a result, the serving BS 12 sends an ACK message for the UE 14.

2. A subset of the BSs 12 of the CoMP set, including the serving BS 12, receives the transmitted TB without error, and the rest of the BSs 12 receive it with error. In this case, the serving BS 12 sends an ACK message for the UE 14.

3. A subset of the BSs 12 of the coordination set that the serving BS 12 is not one of receives the transmitted TB without error, and the rest of the BSs 12, including the serving BS 12, receive it with error. In this situation, the serving BS 12 waits for the feedback from other non-serving BSs 12 about the transmitted TB. If at least one of the non-serving BSs 12 sends a positive acknowledgement for the serving BS 12, the serving BS 12 is able to send an ACK for the UE 14.

If none of these situations occur, and none of the BSs 12 in the CoMP set correctly recover the data from the received TB, the serving BS 12 requests a retransmission of that TB. In this case, it is possible to use Hybrid Automatic Repeat Request (HARQ) with soft combining as a retransmission scheme. HARQ with soft combining is categorized into Chase Combining (CC) and Incremental Redundancy (IR). CC resends the same bits in each retransmission, which can be soft combined. In IR, each retransmission sends a new redundancy version—i.e. a new set of coded bits different from the first. Both of these methods work as follows: the receiver asks for the retransmission up to three times if it cannot recover the data from the initial transmission. In addition, the receiver uses previous erroneous TBs for data recovery in addition to the new received TB. This method increases the accumulated received E_b/N_0 for each retransmission and increases the chance to recover the original data from the received TBs. If after completing four transmissions the BSs 12 cannot recover the original data from the TBs, the MAC layer does not do anything about this TB, and it leaves the error recovery for the upper layer (RLC layer). FIG. 7A illustrates how CC may work in one example, and FIG. 7B illustrates how IR may work in one example.

One problem with these methods is that each transmission and retransmission consumes UE 14 process time. For example, the initial transmission and the first two retransmissions provide an opportunity for the BSs 12 to perform CC based on the three TBs that are identical, but this means that three time slots are wasted to transmit the same TB. In addition, if the BSs 12 are allowed to send retransmission requests to the UE 14 in an independent manner, then another problem arises. FIGS. 8A through 8D illustrate an interaction between multiple BSs 12 where the same TB is transmitted a total of four times to each of the three BSs 12. Consider the case in which one of the BSs 12 receives the transmitted TB error free during some transmission and the other two BSs 12 receive it with error. The second and third BSs 12 may send retransmission requests to the UE 14 directly and as a result, the UE 14 starts the retransmission process. This process is wasteful since the first BS 12 received the TB without error and in essence, a retransmission is not required as discussed above. Rather, the BSs 12 could communicate and let each other know about the status of TB reception at their side. By reducing unnecessary retransmissions, the performance of a UE 14 is enhanced.

FIGS. 9A through 9G illustrate receiving multiple TBs at multiple BSs according to some embodiments of the present disclosure. As in the previous discussion, a CoMP coordination set of three BSs 12 similar to the one shown in FIG. 1 supports the UE 14 upload. In this example, BS 12-1 is the serving BS again, and BS 12-2 and BS 12-3 are the non-serving BSs of the CoMP set.

Figure 9A:
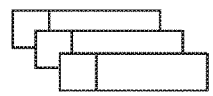

The UE 14 starts to upload the initial TB, and each of the BSs 12 receives this TB. As it is shown in FIG. 9A, the serving BS 12 tries to recover the data from the received TB. The non-serving BSs 12 try to recover the data from the received TB at their side as well. Also they send their feedback to the serving BS 12-1. If at least one of the BSs 12 was able to receive the TB without error, the problem is solved, but if not, the serving BS 12-1 asks the non-serving BSs 12 to send their TB to the serving BS12. Note that during this time, the UE 14 continues uploading other pieces. After receiving the TB from the other BSs 12, the serving BS 12 is able to perform CC on them as it is shown in FIG. 9A. As mentioned earlier, this process increases the chance of recovering the data from the TB. This allows for a CC iteration after only one transmission of the UE 14 instead of the UE 14 needing to repeat the upload two more times to provide three identical TBs for the BSs 12 to increase the chance of data recovery. Rather, the non-serving BSs 12 can send their TBs to the serving BS 12. By doing this, there is the same amount of information at the serving BS 12 that can be used to recover the original data using CC.

If the first CC does not work, the serving BS 12 sends a NACK message regarding this TB to the UE 14. The UE 14 retransmits this TB based on an IR approach in this embodiment (i.e. using a different redundancy version than in the first transmissions) as is shown in FIG. 9B. After receipt of the second redundancy version from the UE 14, the serving BS 12 tries to recover data using IR based on the newly received TB and the previously CC TBs from previous step. At the same time, the non-serving BSs 12 try to recover the TB data from the newly received redundancy version (they just have the new TB and the previous one that they received in previous step in this embodiment, but in other embodiments the TBs may be shared among each BS 12 in the CoMP set). If no BS 12 can recover the original data, then the serving BS 12 again asks the non-serving BSs 12 to send their TB for the serving BS 12. After that, the serving BS 12 performs the CC based on the previous and new TBs as illustrated in FIG. 9C to recover the original data. Again, if the process is successful, the serving BS 12 sends an ACK to the UE 14 but if not, then it sends a NACK to the UE 14. In the latter case, the retransmission process continues up to three times. The next steps are shown in FIGS. 9D through 9G. If after all these steps none of the BSs 12 are able to recover the original data from the received TBs, the MAC layer leaves the task of error free data recovery for the upper layer (RLC layer).

As was discussed previously regarding LTE, the RLC layer may divide the pieces into a number of PDUs, and the MAC layer forms TBs based on the contemporary communication channel condition. If at least one of the BSs 12 of the CoMP set has all the TBs of a piece, the serving BS 12 can ask that BS 12 (if it is not the serving BS 12 itself) to send that piece to the destination network node such as MME 16 or to some other destination network node. It is also possible that none of the BSs 12 of the CoMP set has successfully received all of the TBs of a piece. For this second scenario, it should be noted that the serving BS 12 has all the information about the pieces and their TBs at the non-serving BSs 12, since the non-serving BSs 12 send feedback per each TB to the serving BS 12.

Figure 10:
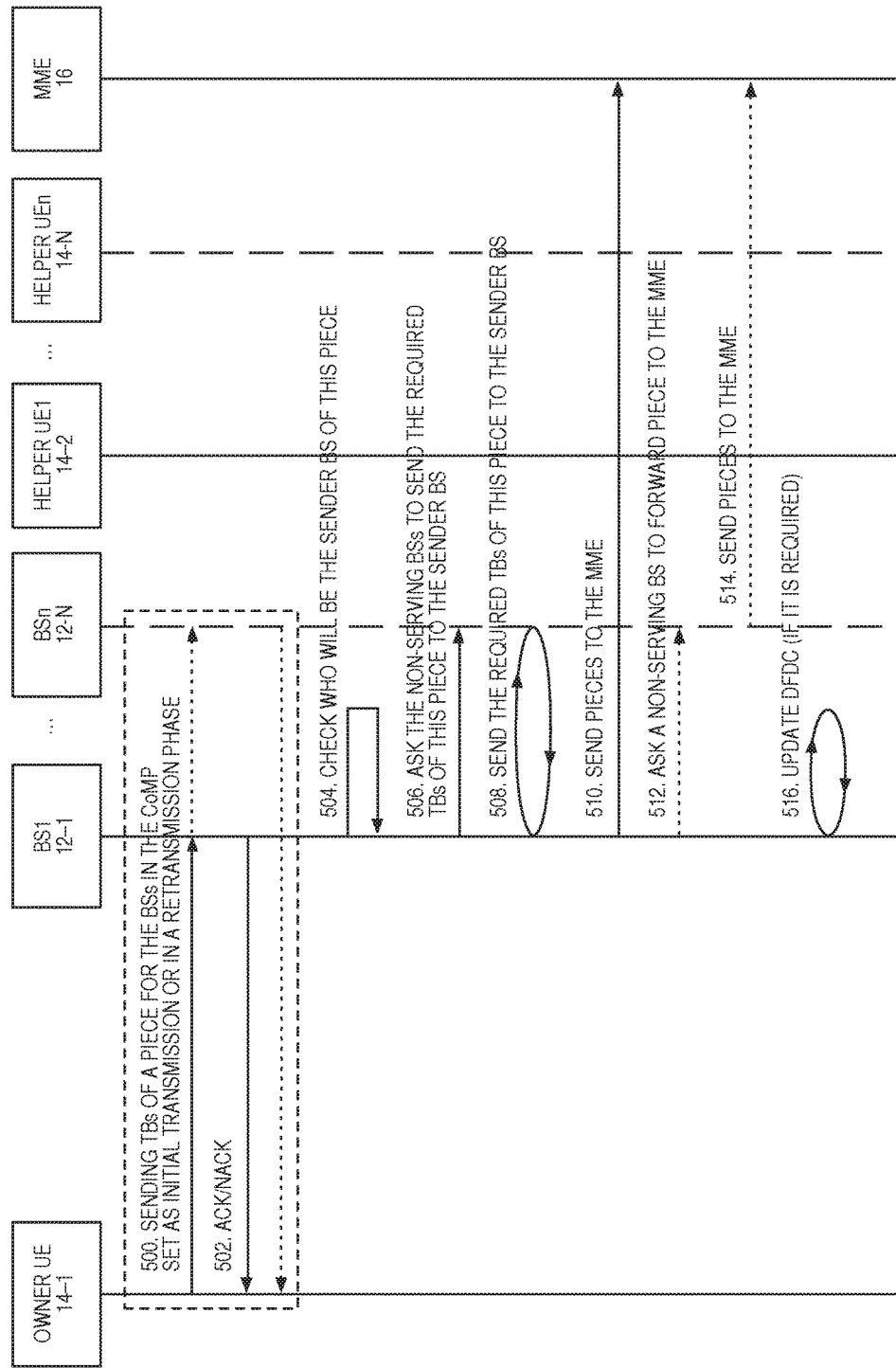
FIG. 10 is a flow chart illustrating a process of determining a sender BS for a piece of the data file uploaded by the owner UE according to some embodiments of the present disclosure.

If the second scenario occurs, the serving BS 12 may select one of the BSs 12 of CoMP set (perhaps the one with the most correctly decoded TBs) as the sender BS 12. The sender BS 12 is the BS 12 which is responsible for sending the current piece to the destination network node (the MME 16 in this and later examples). FIG. 10 is a flow chart illustrating a process of determining a sender BS 12 for a piece of the data file uploaded by the owner UE 14-1 according to some embodiments of the present disclosure.

First, an owner UE 14-1 sends TBs of a piece to the BSs in the CoMP set as initial transmissions or in a retransmission phase (step 500). The owner UE 14-1 then receives either an ACK or a NACK for a TB and may need to retransmit one or more of the TBs (step 502). These steps may proceed as in any of the previous embodiments discussed in regard to correctly decoding TBs. Once all of the TBs for a piece have been correctly received by one or more BSs 12, the serving BS 12-1 checks who will be the sender BS 12 for this piece (step 504). But in this case, the sender BS 12 (which can be the serving BS 12-1 itself or one of non-serving BSs 12) does not have one or some of the TBs of a piece. The serving BS 12-1 solves this problem by querying the BSs 12 to determine which BSs 12 have the missing pieces and requests that they be sent to the sender BS 12 (step 506). The following table shows the message structure that the serving BS 12-1 uses to query the BSs 12 to send specific TBs to the sender BS 12. The serving BS 12-1 may send this message to more than one BS 12 to query for the different TBs of a single piece. In this situation, it inserts the TBs number that it wants from each BS 12 in the 'missing TBs number' field of the message.

TABLE 12

Sender Query Message

| | Field Name | Field Type | Value |
|---|---|---|---|
| 1 | Message ID | Integer (Unitless) | 61 |
| 2 | Serving BS ID | Integer (Unitless) | |
| 3 | Sender BS ID | Integer (Unitless) | |
| 4 | Data File Name | String | |
| 5 | Pieces Number | Integer (Unitless) | |
| 6 | Missing TBs Number | Integer Array | |

The one or more BSs 12 send the required TBs of this piece to the sender BS 12 (step 508). By following this process, the sender BS 12 is the serving BS 12-1, then the serving BS 12-1 is able to form the whole piece and send it to the MME 16 (step 510).

If another BS 12 is the sender BS 12, the serving BS 12-1 asks the non-serving BS 12 to forward the piece to the MME 16 (step 512). The serving BS 12-1 may use the message structure in Table 13 to ask the sender BS 12 (if the serving BS 12-1 itself is not the sender BS 12) to forward the piece to the MME 16.

TABLE 13

Sender Forwarding Message

| | Field Name | Field Type | Value |
|---|---|---|---|
| 1 | Message ID | Integer (Unitless) | 62 |
| 2 | Serving BS ID | Integer (Unitless) | |
| 3 | Owner UE ID | Integer (Unitless) | |
| 4 | Data File Name | String | |
| 5 | Pieces Number | Integer (Unitless) | |

The sender BS 12 then sends the piece to the MME 16 (step 514). In all three approaches (UPS, VPS and DPS), the BSs 12 may use the message structure in Table 14 to forward a piece for the MME 16. The required information to fill this message is already available in the received piece.

TABLE 14

Message structure that BSs use to send a piece for the MME

| | Field Name | Field Type | Value |
|---|---|---|---|
| 1 | Message ID | Integer (Unitless) | 72 |
| 2 | Owner UE ID | Integer (Unitless) | |
| 3 | Serving BS ID | Integer (Unitless) | |
| 4 | Sender BS ID | Integer (Unitless) | |
| 5 | Data File Name | String | |
| 6 | Pieces Number | Integer (Unitless) | |
| 7 | First Byte Address | Integer (Unitless) | |
| 8 | Last Byte Address | Integer (Unitless) | |
| 9 | Data Load | | |

Lastly, the serving BS 12-1 updates a DFD Complements (DFDC) file for the data file being uploaded, if it is required (step 516). This will be discussed in more detail below.

Figure 11:
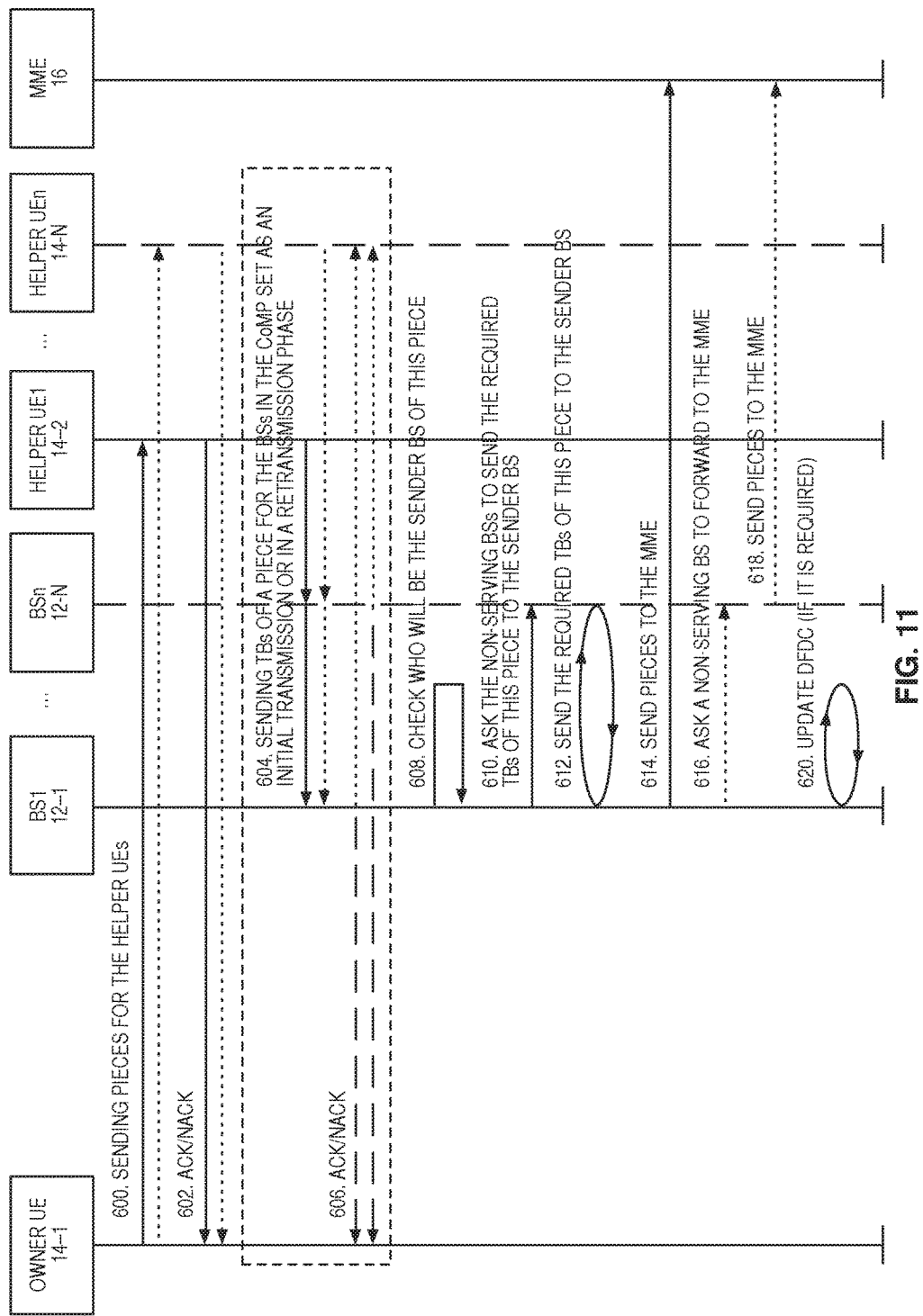
FIG. 11 is a flow chart illustrating a process of determining a sender BS for a piece of the data file using one or more helper UEs according to some embodiments of the present disclosure.

FIG. 10 only showed how pieces were handled when the owner UE 14-1 uploaded the piece itself. FIG. 11 is a flow chart illustrating a process of determining a sender BS 12 for a piece of the data file using one or more helper UEs 14 according to some embodiments of the present disclosure. First, an owner UE 14-1 sends pieces to one or more helper UEs 14 as discussed above (step 600). The owner UE 14-1 receives either an ACK or a NACK regarding this transmission (step 602) and may resend and pieces that were not correctly received. Once a helper UE such as helper UE 14-2 has the piece, the helper UE 14-2 sends TBs of a piece to the BSs in the CoMP set as initial transmissions or in a retransmission phase (step 604). The helper UE 14-2 then receives either an ACK or a NACK for a TB and may need to retransmit one or more of the TBs (step 606). These steps may proceed as in any of the previous embodiments discussed in regard to correctly decoding TBs. Once all of the TBs for a piece have been correctly received by one or more BSs 12, the serving BS 12-1 checks who will be the sender BS 12 for this piece (step 608). In this case, the sender BS 12 (which can be the serving BS 12-1 itself or one of non-serving BSs 12) does not have one or some of the TBs of a piece. The serving BS 12-1 solves this problem by querying the BSs 12 to determine which BSs 12 have the missing pieces and requests that they be sent to the sender BS 12 (step 610). This step may use the same format as discussed above in regard to step 506. The serving BS 12-1 may send this message to more than one BS 12 to query for the different TBs of a single piece. In this situation, it inserts the TBs number that it wants from each BS 12 in the 'missing TBs number' field of the message.

The one or more BSs 12 send the required TBs of this piece to the sender BS 12 (step 612). By following this process, the sender BS 12 is the serving BS 12-1, then the serving BS 12-1 is able to form the whole piece and send it to the MME 16 (step 614). If another BS 12 is the sender BS 12, the serving BS 12-1 asks the non-serving BS 12 to forward the piece to the MME 16 (step 616). The serving BS 12-1 may use the message structure in Table 13 to ask the sender BS 12 (if the serving BS 12-1 itself is not the sender BS 12) to forward the piece to the MME 16. The sender BS 12 then sends the piece to the MME 16 (step 618). In all three approaches (UPS, VPS and DPS), the BSs 12 may use the message structure in Table 14 to forward a piece to the MME 16. The required information to fill this message is already available in the received piece. Lastly, the serving BS 12-1 updates a DFD Complements (DFDC) file for the data file being uploaded, if it is required (step 620). This will be discussed in more detail below.

Figure 12:
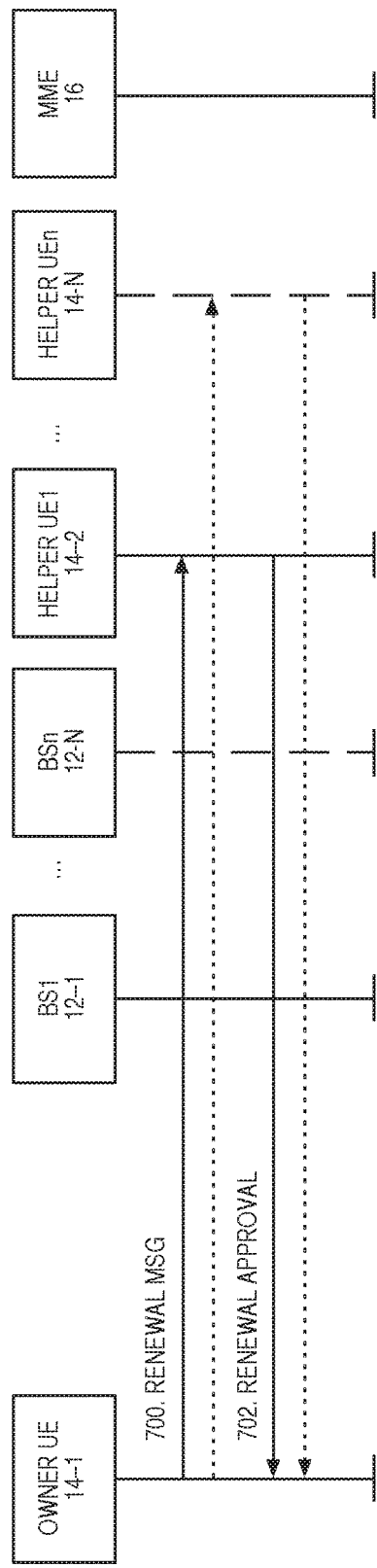
FIG. 12 is a flow chart illustrating a process of renewing assistance of one or more helper UEs according to some embodiments of the present disclosure.

During any of these processes, an owner UE 14-1 may want to extend its cooperation with a helper UE 14. FIG. 12 is a flow chart illustrating a process of renewing assistance of one or more helper UEs 14 according to some embodiments of the present disclosure. In this case, the owner UE 14-1 sends a renewal message to the helper UE 14-2 to inform it of the remaining pieces that are required to be uploaded (step 700). The owner UE 14-1 may select one of the message structures in Tables 15 to 17 based on the selected method.

TABLE 15

Renewal message structure in UPS method

| | Field Name | Field Type | Value |
|---|---|---|---|
| 1 | Message ID | Integer (Unitless) | 81 |
| 2 | Owner UE ID | Integer (Unitless) | |
| 3 | Data File Name | String | |
| 4 | Number of Remaining Pieces | Integer (Unitless) | |

TABLE 16

Renewal message structure in VPS method

| | Field Name | Field Type | Value |
|---|---|---|---|
| 1 | Message ID | Integer (Unitless) | 82 |
| 2 | Owner UE ID | Integer (Unitless) | |
| 3 | Data File Name | String | |
| 4 | Remaining Data Size | Integer (KB) | |
| 5 | Pieces Length | Integer Array(KB) | |

TABLE 17

Renewal message structure in DPS method

| | Field Name | Field Type | Value |
|---|---|---|---|
| 1 | Message ID | Integer (Unitless) | 83 |
| 2 | Owner UE ID | Integer (Unitless) | |
| 3 | Data File Name | String | |
| 4 | Remaining Data Size | Integer (KB) | |

The owner UE 14-1 uses the renewal message when it estimates that the helper UE 14 is close to finishing the upload of the assigned pieces. The owner UE 14-1 can make such an estimation based on the total size of the pieces that it sent for the specific helper UE 14 and the elapsed time since that time. Also, it can use the ACK feedback from the serving BS 12-1 (ACK messages of the received pieces show how much data is left at the helper UE 14 that is required to be uploaded). Another important factor is the upload data rate of the helper UE 14. There are two approaches that help the owner UE 14-1 to receive this information. The helper UE 14 may announce its upload data rate to the owner UE 14-1 when it sends the confirmation message (although it can change as the time passes). Also, the serving BS 12-1 may send a control message for the owner UE 14-1 in the fixed intervals that show the latest upload data rate of the helper UEs 14.

In response to receiving the renewal message, the helper UE 14 sends back a renewal approval message that indicates if it wants to continue the cooperation with the owner UE 14-1 or not (step 702). It may use one of the message structures in Table 18 or 19 (based on the selected method). In case of VPS, the helper UE 14 must select the preferred piece sizes based on the provided information in the received renewal message. In case of using DPS, the helper UE 14 considers the preferred piece size based on its communication channel condition with the serving BS 12-1 (or the BSs 12 in the CoMP set). If the helper UE 14 finishes the upload of the pieces that was assigned to it by the owner UE 14-1, it may want to help the owner UE 14-1 further. To do so, the helper UE 14 may send a renewal approval message even before receiving a renewal request from the owner UE 14-1.

TABLE 18

Renewal approval message structure in UPS method

| | Field Name | Field Type | Value |
|---|---|---|---|
| 1 | Message ID | Integer (Unitless) | 84 |
| 2 | Renewal | Boolean | |
| 3 | Helper UE ID | Integer (Unitless) | |
| 4 | Data File Name | String | |
| 5 | Max Number of the Pieces | Integer (In KB) | |

TABLE 19

Renewal approval message structure in VPS and DPS methods

| | Field Name | Field Type | Value |
|---|---|---|---|
| 1 | Message ID | Integer (Unitless) | 85 |
| 2 | Renewal | Boolean | |
| 3 | Helper UE ID | Integer (Unitless) | |
| 4 | Max Data Size Offer to Help in Upload | Integer (In KB) | |
| 5 | Preferred Piece Size | Integer (In KB) | |
| 6 | Datafile Name | String | |

Figure 13:
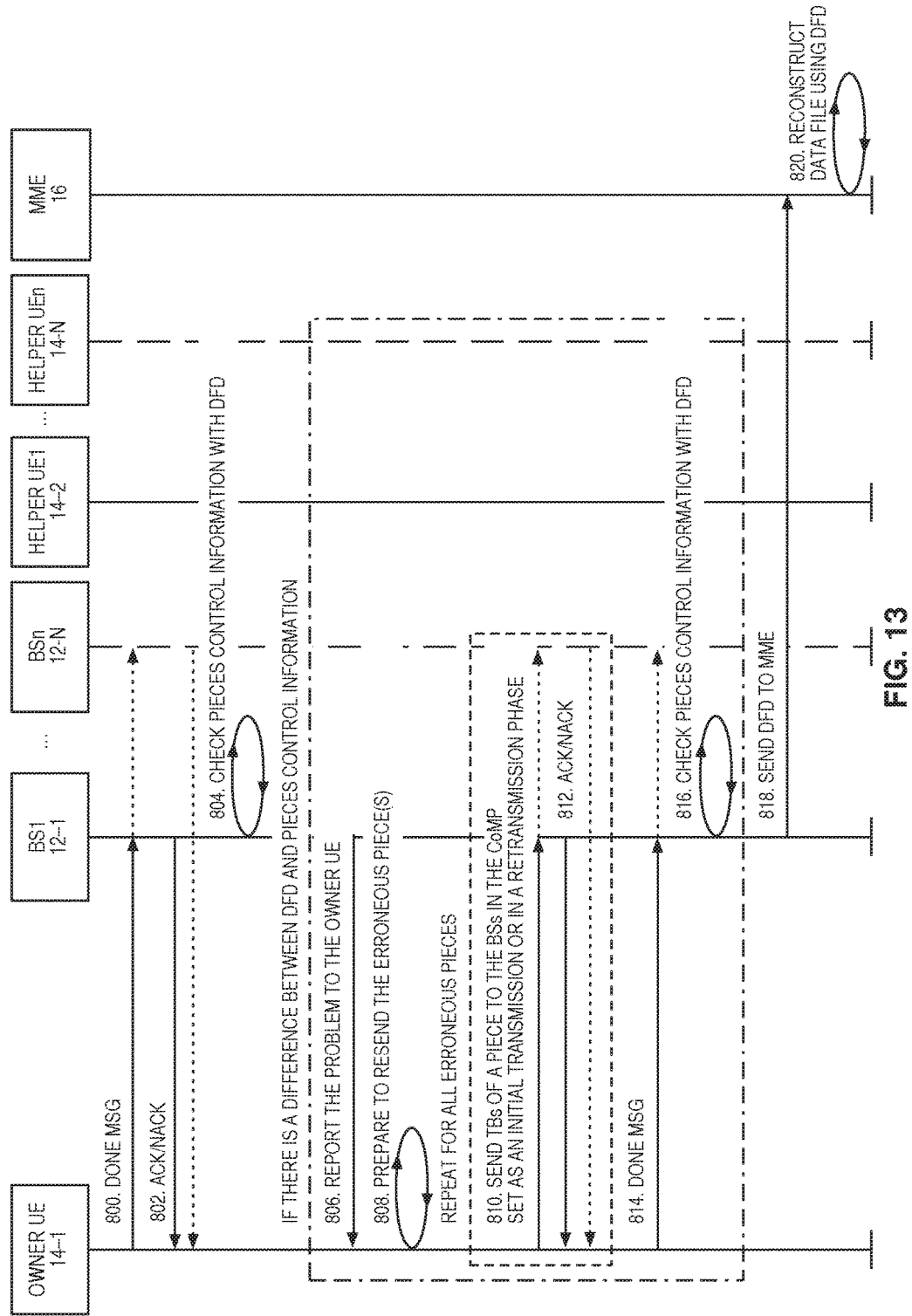
FIG. 13 is a flow chart illustrating a process of reconstructing the data file according to some embodiments of the present disclosure.

Once all of the pieces have been uploaded, they may need to be reassembled. FIG. 13 is a flow chart illustrating a process of reconstructing the data file according to some embodiments of the present disclosure. After sending all the pieces of the data file to the BSs 12 in the CoMP set, the owner UE 14-1 may use the message structure in Table 20 to send a done message to the CoMP set to announce that it finished the upload of all the pieces (step 800).

TABLE 20

Done message in UPS, VPS and DPS

| | Field Name | Field Type | Value |
|---|---|---|---|
| 1 | Message ID | Integer (Unitless) | 91 |
| 2 | Serving BS ID | Integer (Unitless) | |
| 3 | Owner UE ID | Integer (Unitless) | |
| 4 | Last Piece Number | Integer (Unitless) | |

One or more of the BSs 12 may send an ACK or NACK indicating that the done message was properly received or not (step 802).

The third and the last level of error checking occur in the layers above the RLC layer. In this step, the serving BS 12-1 checks the received pieces information with the DFD file (step 804) to make sure that the BSs 12 of the CoMP set collectively received the pieces of the UE data file completely and correctly. As described in the previous sections, during the upload process, the non-serving BSs 12 of the CoMP set send the control information of the received pieces to the serving BS 12-1. Therefore, at the end of the upload process, the serving BS 12-1 has the control information of all the received pieces in some embodiments. It inserts the information of each piece into a DFDC list. A possible DFDC structure is illustrated in Table 21. In this table, the piece's status is one (1) if it has been received correctly otherwise it is zero (0). The length of the piece number array is equal to the number of the pieces and there is a corresponding piece status array, which includes the information about the reception of the pieces.

TABLE 21

DFDC structure in UPS, VPS and DPS methods

| | Field Name | Field Type | Value |
|---|---|---|---|
| 1 | Message ID | Integer (Unitless) | 92 |
| 2 | Serving BS ID | Integer (Unitless) | |
| 3 | Owner UE ID | Integer (Unitless) | |
| 4 | Data File Name | String | |
| 5 | Piece Number | Integer Array (Unitless) | |
| 6 | Piece Status | Integer Array (Unitless) | |
| 7 | First Byte Address | Integer Array (Unitless) | |
| 8 | Last Byte Address | Integer Array (Unitless) | |

After receiving the done message from the owner UE 14-1, the serving BS 12-1 checks the DFD and DFDC together to see if their information about the pieces are the same. If the information does not match, the serving BS 12-1 sends a report (DFDC) to the owner UE 14-1 (step 806) to let it know about the pieces that have not been correctly received. The owner UE 14-1 tries to resend erroneous pieces based on what has been discussed in the previous sections (steps 808 through 812). After that, the owner UE 14-1 sends the done message to the BSs 12 of the CoMP set again (step 814). The serving BS 12-1 again checks the pieces (step 816). If these steps help the serving BS 12-1 to resolve the problem, then the serving BS sends the final DFD for the MME 16 (step 818). Otherwise, the serving BS 12-1 may cancel the whole upload process and inform the owner UE 14-1 that the upload process was unsuccessful. In this embodiment, the MME 16 may reconstruct the data file using the DFD (step 820).

Figure 14:
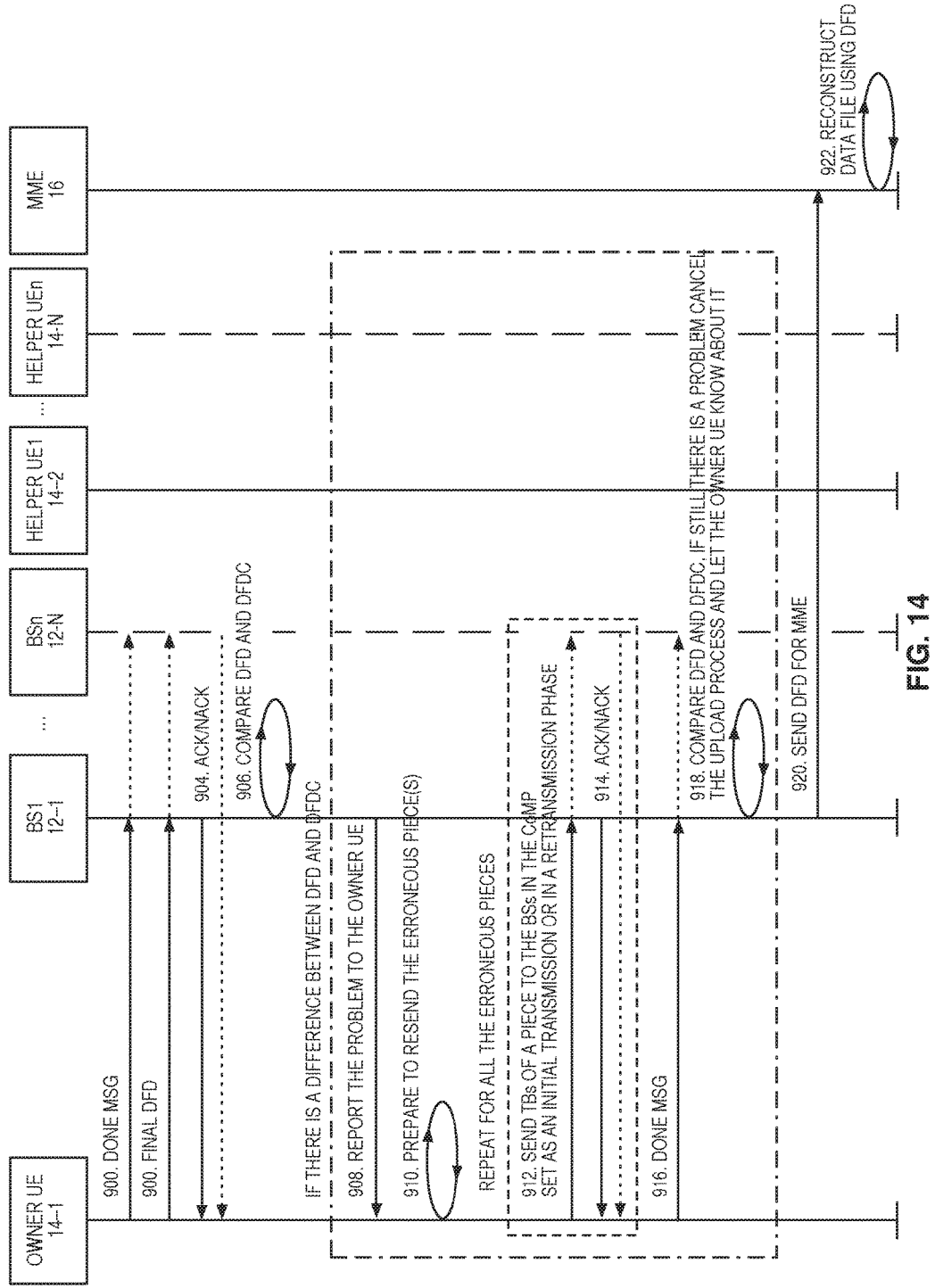
FIG. 14 is a flow chart illustrating a process of reconstructing the data file when dynamic piece sizes may have been used according to some embodiments of the present disclosure.

In the UPS and VPS methods, once the owner UE 14-1 creates the DFD at the beginning of the upload process, it does not change the DFD during the upload process. Therefore, the serving BS 12-1 uses the same DFD file that it received in the primary steps of the upload process to check if all the pieces were received correctly or not. In the case of the DPS method, this process is a bit different. When an owner UE 14-1 uses the DPS method for the upload process, it should update the DFD during the upload process and send the final DFD to the serving BS 12-1 after sending the done message in some embodiments. This embodiment is shown in FIG. 14, which is a flow chart illustrating a process of reconstructing the data file when dynamic piece sizes may have been used according to some embodiments of the present disclosure. After sending all the pieces of the data file to the BSs 12 in the CoMP set, the owner UE 14-1 may use the message structure in Table 20 to send a done message to the BSs in the CoMP set to announce that it finished the upload of all the pieces (step 900). In this embodiment, the owner UE 14-1 also sends the final DFD to the BSs 12 in the CoMP set (step 902). One or more of the BSs 12 may send an ACK or NACK indicating that the done message was properly received or not (step 904).

The serving BS 12-1 checks the received pieces information with the DFD file to make sure that the BSs 12 of the CoMP set collectively received the pieces of the UE data file completely and correctly. As described in the previous sections, during the upload process, the non-serving BSs 12 of the CoMP set send the control information of the received pieces to the serving BS 12-1. Therefore, at the end of the upload process, the serving BS 12-1 has the control information of all the received pieces in some embodiments. It inserts the information of each piece into a DFDC list. After receiving the done message from the owner UE 14-1, the serving BS 12-1 checks the DFD and DFDC together to see if their information about the pieces are the same (step 906). If the information does not match, the serving BS 12-1 sends a report (DFDC) to the owner UE 14-1 (step 908) to let it know about the pieces that have not been correctly received. The owner UE 14-1 tries to resend erroneous pieces based on what has been discussed in the previous sections (steps 910 through 914). After that, the owner UE 14-1 sends the done message to the BSs 12 of the CoMP set again (step 916). The serving BS 12-1 again checks the pieces (step 918). If these steps help the serving BS 12-1 to resolve the problem, then the serving BS sends the final DFD for the MME 16 (step 920). Otherwise, the serving BS 12-1 may cancel the whole upload process and inform the owner UE 14-1 that the upload process was unsuccessful. In this embodiment, the MME 16 may reconstruct the data file using the DFD (step 922).

Figure 15:
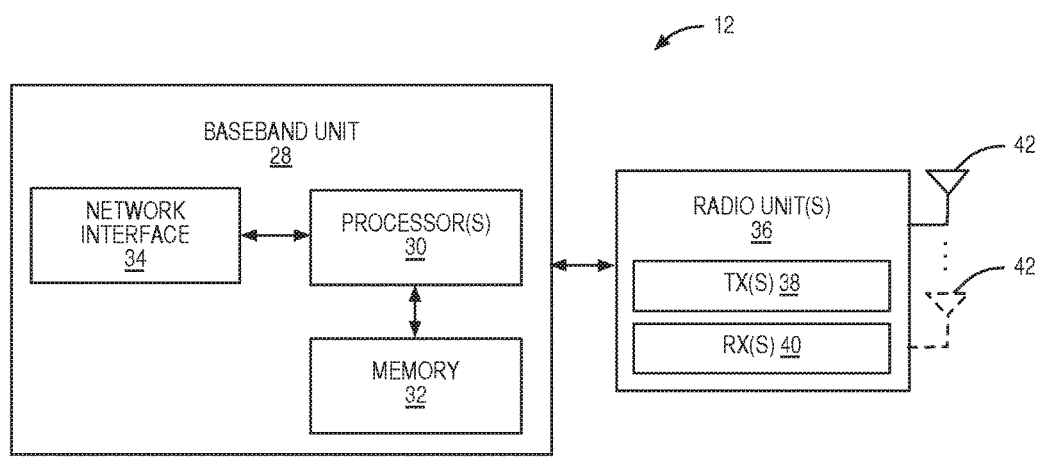
FIG. 15 is a diagram of a network node according to some embodiments of the present disclosure.

FIG. 15 is a diagram of a network node 12 according to some embodiments of the present disclosure. As used herein, this network node 12 may be a BS 12 or any other network node capable of performing the processes discussed herein. In some embodiments, the network node 12 includes circuitry containing instructions, which when executed, cause the network node 12 to implement the methods and functionality described herein. In one example, the circuitry can be in the form of processing means which may include a processor and a memory containing instructions. As illustrated, the network node 12 includes a baseband unit 28 that includes at least one processor 30 and memory 32. The baseband unit 28 also includes a network interface 34. As illustrated, the network node 12 also includes a radio unit 36 with a one or more transmitters 38, one or more receivers 40, and one or more antennas 42. In some embodiments, the network node 12, or the functionality of the network node 12 described with respect to any one of the embodiments described herein, is implemented in software that is stored in, e.g., the memory 32 and executed by the processor 30. The network interface 34 may include one or more components (e.g., network interface card(s)) that connect the network node 12 to other systems.

In some embodiments, a computer program including instructions which, when executed by the at least one processor 30, causes the at least one processor 30 to carry out the functionality of the network node 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 32).

Figure 16:
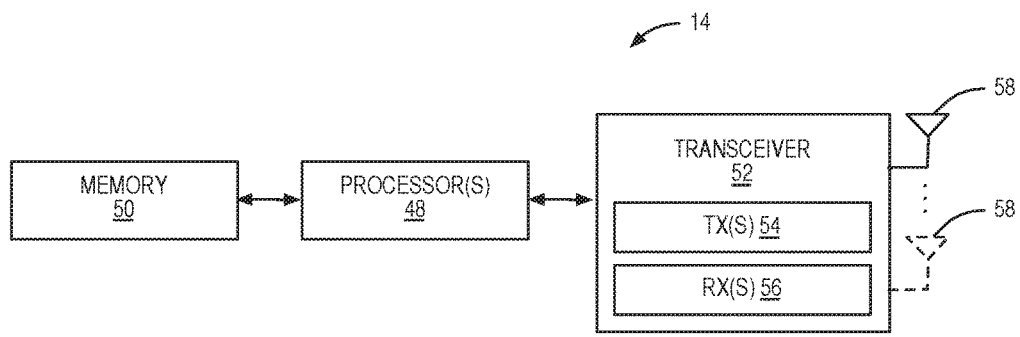
FIG. 16 is a diagram of a wireless device according to some embodiments of the present disclosure.

FIG. 16 is a diagram of a wireless device 14 according to some embodiments of the present disclosure. As illustrated, the wireless device 14 includes at least one processor 48 and memory 50. The wireless device 14 also includes a transceiver 52 with one or more transmitters 54, one or more receivers 56, and one or more antennas 58. In some embodiments, wireless device 14, or the functionality of the wireless device 14 described with respect to any one of the embodiments described herein, is implemented in software that is stored in, e.g., the memory 50 and executed by the processor 48. The transceiver 52 uses the one or more antennas 58 to transmit and receive signals and may include one or more components that connect the wireless device 14 to other systems.

In some embodiments, a computer program including instructions which, when executed by at least one processor 48, causes the at least one processor 48 to carry out the functionality of the wireless device 14 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 17:
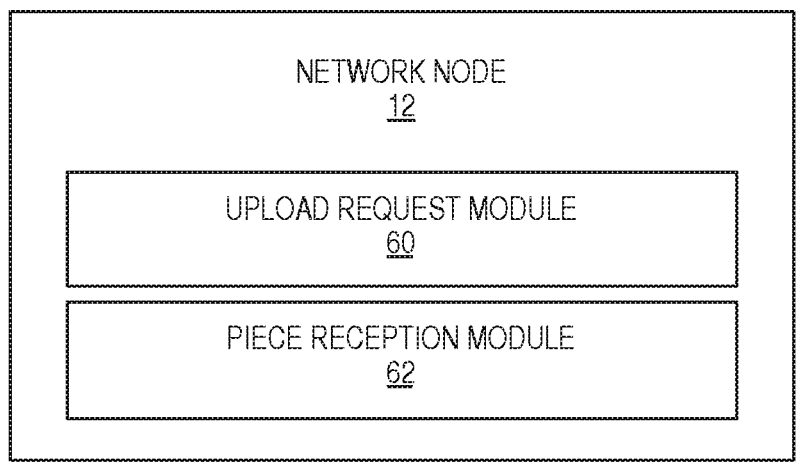
FIG. 17 is a diagram of a network node including modules according to some embodiments of the present disclosure.

FIG. 17 is a diagram of a network node 12 including an upload request module 60 and a piece reception module 62 according to some embodiments of the present disclosure. The upload request module 60 and a piece reception module 62 are each implemented in software that, when executed by a processor of the network node 12, causes the network node 12 to operate according to one of the embodiments described herein. The upload request module 60 operates to receive an upload request message, as described above with respect to the receiving step 400. The piece reception module 62 operates to receive one or more pieces as discussed above with respect to steps 402 and 404.

Figure 18:
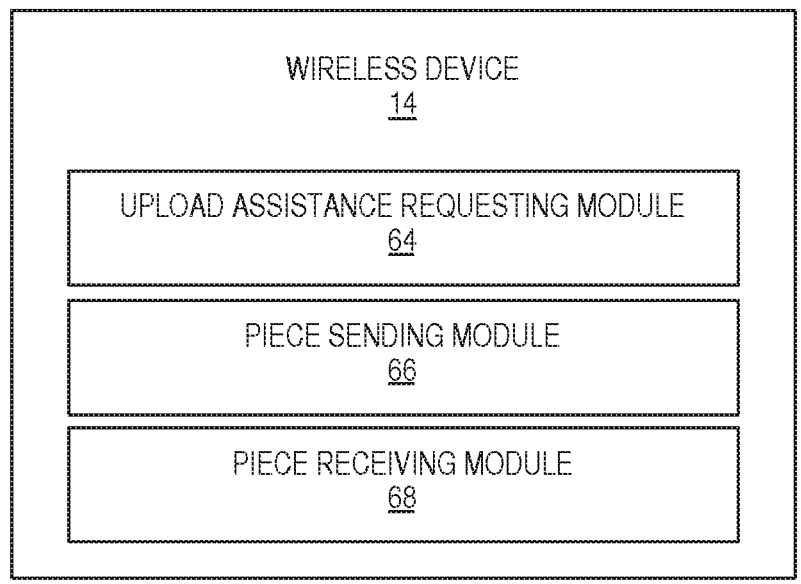
FIG. 18 is a diagram of a wireless device including modules according to some embodiments of the present disclosure.

FIG. 18 is a diagram of a wireless device 14 including an upload assistance requesting module 64, a piece sending module 66, and a piece receiving module 68 according to some embodiments of the present disclosure. The upload assistance requesting module 64, the piece sending module 66, and the piece receiving module 68 are each implemented in software that, when executed by a processor of the wireless device 14, causes the wireless device 14 to operate according to one of the embodiments described herein. The upload assistance requesting module 64 operates to send an upload request message as described above with respect to the receiving step 204. The piece sending module 66 operates to send one or more pieces as discussed above with respect to step 210. The piece receiving module 68 operates to receive one or more pieces as discussed above with respect to step 304.

The following acronyms are used throughout this disclosure.

3GPP 3$^{rd}$ Generation Partnership Project
3G 3rd Generation
4G 4th Generation
5G 5th Generation
ACK Acknowledgement
CB Coordinated Beamforming
CC Chase Combining
CoMP Coordinated Multi-Point
CS Coordinated Scheduling
D2D Device to Device
DFD Data File Descriptor
DFDC DFD Complements
DL Downlink
DPS Dynamic Piece Size
eNB evolved node B
HARQ Hybrid Automatic Repeat Request
IR Incremental Redundancy
JP Joint Processing
LEE Laptop Embedded Equipment
LME Laptop Mounted Equipment
LTE Long Term Evolution
LTE-A LTE-Advanced
M2M Machine-to-Machine
MAC Media Access Control
MME Mobility Management Entity
MTC Machine Type Communication
NACK Negative Acknowledgement
PDCP Packet Data Convergence Protocol
PDU Protocol Data Unit
RLC Radio Link Control
SRS Sounding Reference Symbol
TB Transport Block
UE User Equipment
UL Uplink
UMTS Universal Mobile Telecommunications System
UPS Uniform Piece Size
VPS Variable Piece Size
WiMAX Worldwide Interoperability for Microwave Access Those skilled in the art will recognize improvements and modifications to the embodiments of the present disclosure. All such improvements and modifications are considered within the scope of the concepts disclosed herein and the claims that follow.

What is claimed is:

1. A method of operation of a first wireless device for uploading a data file as a plurality of pieces to a destination network node in a wireless communications network comprising:
    dividing the data file into the plurality of pieces;
    sending one or more pieces of the plurality of pieces to one or more second wireless devices to be uploaded to the destination network node; and
    uploading the one or more pieces of the plurality of pieces via a Coordinated Multi-Point, CoMP, set of cooperating nodes in the wireless communication network.

2. The method of claim 1 further comprising:
    prior to sending the one or more pieces of the plurality of pieces, sending an upload assistance message to the one or more second wireless devices;
    in response to the upload assistance message sent to the one or more second wireless devices, receiving an upload assistance confirmation message from the one or more second wireless devices; and
    sending the one or more pieces of the plurality of pieces in response to the upload assistance confirmation message received from the one or more second wireless devices.

3. The method of claim 2 wherein sending the upload assistance message to the one or more second wireless devices and sending the one or more pieces of the plurality of pieces to the one or more second wireless devices are accomplished using Device-to-Device, D2D, communication.

4. The method of claim 1 further comprising:
    creating a Data File Descriptor, DFD, which describes how the data file to be uploaded is partitioned into the plurality of pieces; and
    sending an upload request message to a serving base station of the first wireless device.

5. The method of claim 4 further comprising:
    in response to sending the upload request message, receiving a handshake message from the serving base station; and
    in response to receiving the handshake message, sending a message to the serving base station including the DFD.

6. The method of claim 4 wherein the DFD comprises an indication of a size of each of the plurality of pieces to be uploaded to the destination network node.

7. The method of claim 6 wherein the indication of the size of each of the plurality of pieces in the DFD is an indication that the size of each of the plurality of pieces is a uniform size.

8. The method of claim 6 wherein the indication of the size of each of the plurality of pieces in the DFD is an indication of the size of each of the plurality of pieces where the size of each of the plurality of pieces may be variable.

9. The method of claim 6 wherein the indication of the size of each of the plurality of pieces in the DFD is an indication that the size of each of the plurality of pieces may be dynamic.

10. The method of claim 4 wherein the DFD comprises the size of each of the plurality of pieces that has been determined.

11. The method of claim 1 wherein sending the one or more pieces of the plurality of pieces to the one or more second wireless devices to be uploaded to the destination network node further comprises determining which pieces of the plurality of pieces to send to the one or more second wireless devices based on one or more of the group consisting of:
a number of pieces in the plurality of pieces;
a size of the pieces in the plurality of pieces;
a number of pieces the one or more second wireless devices is willing to upload; an amount of data the one or more second wireless devices is willing to upload; and
an upload bitrate of the one or more second wireless devices.

12. The method of claim 11 wherein retransmission of the one or more pieces of the plurality of pieces uploaded via the CoMP set of cooperating nodes is requested only if the CoMP set cannot correctly decode the one or more pieces of the plurality of pieces uploaded via the CoMP set using a soft combination of signals received at one or more nodes in the CoMP set.

13. The method of 12 wherein using the soft combination of signals received at the one or more nodes in the CoMP set comprises using the soft combination of signals received at more than one node in the CoMP set.

14. The method of claim 1 wherein the size of the pieces in the plurality of pieces is based on a channel quality from the one or more second wireless devices to one or more nodes in the CoMP set of cooperating nodes.

15. The method of claim 14 wherein retransmission of the one or more pieces of the plurality of pieces uploaded via the CoMP set of cooperating nodes is requested only if no node in the CoMP set correctly decoded the one or more of the plurality of pieces uploaded via the CoMP set.

16. The method of claim 1 wherein uploading the one or more pieces of the plurality of pieces via the CoMP set of cooperating nodes comprises receiving an upload grant from one or more cooperating nodes in the CoMP set.

17. The method of claim 1 wherein the destination network node is a serving base station of the first wireless device.

18. The method of claim 1 wherein the destination network node is a node in a core network of the wireless communications network.

19. The method of claim 1 wherein the one or more second wireless devices receive an incentive for uploading the one or more pieces of the plurality of pieces.

20. A method of operation of a second wireless device for uploading a data file as a plurality of pieces to a destination network node in a wireless communications network comprising:
receiving an upload assistance message from a first wireless device using Device-to-Device, D2D, communication;
in response to the upload assistance message received from the first wireless device, sending an upload assistance confirmation message to the first wireless device;
receiving one or more pieces of the plurality of pieces from the first wireless device to be uploaded to the destination network node using D2D communication in response to the upload assistance confirmation message sent to the first wireless device; and
uploading the one or more pieces of the plurality of pieces to the destination network node via a Coordinated Multi Point, CoMP, set of cooperating nodes in the wireless communication network.

21. The method of claim 20 wherein retransmission of the one or more pieces of the plurality of pieces uploaded via the CoMP set of cooperating nodes is requested only if no node in the CoMP set correctly decoded the one or more pieces of the plurality of pieces uploaded via the CoMP set.

22. The method of claim 20 wherein retransmission of the one or more pieces of the plurality of pieces uploaded via the CoMP set of cooperating nodes is requested only if the CoMP set cannot correctly decode the one or more pieces of the plurality of pieces uploaded via the CoMP set using a soft combination of signals received at each node in the CoMP set.

23. A method of operation of a destination network node in a wireless communications network for receiving a data file from a first wireless device as a plurality of pieces comprising:
receiving an upload request message from the first wireless device; and
receiving one or more pieces of the plurality of pieces from a network node that is a serving base station of a second wireless device where the second wireless device received the one or more pieces of the plurality of pieces from the first wireless device;
where the destination network node and the network node that is the serving base station of the second wireless device are part of a Coordinated Multi-Point, CoMP, set of cooperating nodes in the wireless communication network.

24. The method of claim 23 further comprising:
if no node in the CoMP set correctly decoded the one or more pieces of the plurality of pieces uploaded via the CoMP set, requesting retransmission of the one or more pieces of the plurality of pieces uploaded via the CoMP set of cooperating nodes.

25. The method of claim 23 further comprising:
if the CoMP set cannot correctly decode the one or more pieces of the plurality of pieces uploaded via the CoMP set using a soft combination of signals received at one or more nodes in the CoMP set, requesting retransmission of the one or more pieces of the plurality of pieces uploaded via the CoMP set of cooperating nodes.

26. The method of claim 25 wherein the soft combination is performed by using a Chase Combining technique.

27. The method of claim 25 wherein the soft combination is performed by an Incremental Redundancy technique.

28. A first wireless device for uploading a data file as a plurality of pieces to a destination network node in a wireless communications network comprising:
a processor; and
memory containing instructions executable by the processor whereby the device is operative to:
divide the data file into the plurality of pieces;

send one or more pieces of the plurality of pieces to one or more second wireless devices to be uploaded to the destination network node; and upload one or more pieces of the plurality of pieces via a Coordinated Multi-Point, CoMP, set of cooperating nodes in the wireless communication network.

* * * * *